United States Patent
Yuan et al.

(10) Patent No.: US 11,695,710 B2
(45) Date of Patent: Jul. 4, 2023

(54) BUFFER MANAGEMENT METHOD AND APPARATUS

(71) Applicant: Huawei Technologies Co., Ltd., Shenzhen (CN)

(72) Inventors: Sai Yuan, Beijing (CN); Xiaozhong Wang, Beijing (CN); Guang Li, Beijing (CN); Yu Bai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 78 days.

(21) Appl. No.: 17/408,057

(22) Filed: Aug. 20, 2021

(65) Prior Publication Data
US 2021/0392092 A1    Dec. 16, 2021

Related U.S. Application Data

(63) Continuation of application No. PCT/CN2019/075935, filed on Feb. 22, 2019.

(51) Int. Cl.
*H04L 12/861* (2013.01)
*H04L 49/90* (2022.01)

(52) U.S. Cl.
CPC .............................. *H04L 49/9084* (2013.01)

(58) Field of Classification Search
None
See application file for complete search history.

(56) References Cited

U.S. PATENT DOCUMENTS

| | | | |
|---|---|---|---|
| 2002/0071387 A1 | 6/2002 | Horiguchi et al. | |
| 2005/0240745 A1 | 10/2005 | Iyer et al. | |
| 2006/0031565 A1* | 2/2006 | Iyer | H04L 49/90 709/234 |
| 2008/0192765 A1 | 8/2008 | Oh et al. | |
| 2011/0286468 A1 | 11/2011 | Tomonaga et al. | |
| 2012/0182870 A1 | 7/2012 | Francini | |

(Continued)

FOREIGN PATENT DOCUMENTS

| | | |
|---|---|---|
| CN | 102223675 A | 10/2011 |
| CN | 102404206 A | 4/2012 |
| CN | 102595512 A | 7/2012 |

(Continued)

OTHER PUBLICATIONS

Wei-Yan, L., et al, "Congestion control algorithm based on dynamic threshold," 2013, 3 pages.

(Continued)

*Primary Examiner* — Kouroush Mohebbi
(74) *Attorney, Agent, or Firm* — Huawei Technologies Co., Ltd

(57) ABSTRACT

A memory management method includes: determining that available storage space of a first memory in a network device is less than a first threshold, where the first threshold is greater than 0 and the first memory stores a first packet queue; and deleting at least one packet at the tail of the first packet queue from the first memory based on the available storage space of the first memory being less than the first threshold. When the available storage space of the first memory is less than the first threshold, a packet queue, namely, the first packet queue, is selected and a packet at the tail of the packet queue is deleted from the first memory.

15 Claims, 11 Drawing Sheets

Select a packet queue with a highest latency for migration

Migrate a packet at the tail of the packet queue

(56) References Cited

U.S. PATENT DOCUMENTS

2017/0134282 A1     5/2017  Agarwal et al.

FOREIGN PATENT DOCUMENTS

| CN | 102789336 A | 11/2012 |
| CN | 102957629 A | 3/2013 |
| CN | 103647726 A | 3/2014 |
| CN | 105978821 A | 9/2016 |
| CN | 106330760 A | 1/2017 |
| CN | 106598495 A | 4/2017 |
| CN | 106789729 A | 5/2017 |
| CN | 109343790 A | 2/2019 |
| EP | 2884707 A1 | 6/2015 |
| JP | 2002185501 A | 6/2002 |
| JP | 2014506075 A | 3/2014 |
| WO | 2010089886 A1 | 8/2010 |
| WO | 2016202120 A1 | 12/2016 |
| WO | 2018107681 A1 | 6/2018 |

OTHER PUBLICATIONS

Zhang, Ronghua, et al, "Design and Implementation of Dynamic Memory Manage Based on Linked List," 2011, 4 pages.

Yuichi Morishita et al., "Effect of RED based queuing control on VoIP networks with call admission control," IEICE Technical Report, vol. 106, No. 495 Japan, The Institute of Electronics, Information and Communication Engineers Jan. 18, 2007, 8 pages.

Yang Minhua, "Research on queue scheduling method in traffic management system," Wireless Internet Technology, No. 20, Oct. 2016, 2 pages.

\* cited by examiner

BUFFER MANAGEMENT METHOD AND APPARATUS

CROSS-REFERENCE TO RELATED APPLICATIONS

This is a continuation of Int'l Patent App. No. PCT/CN2019/075935, filed on Feb. 22, 2019, which is incorporated by reference.

TECHNICAL FIELD

This disclosure relates to the field of communications technologies, and in particular, to a buffer management method and apparatus.

BACKGROUND

A network device includes a memory. The memory may also be referred to as a buffer. The memory may store a packet queue. When receiving a packet, the network device may enqueue the packet into the packet queue.

In an existing solution, a packet queue needs to be managed based on duration in which the last packet in the packet queue needs to stay in the packet queue. The foregoing solution is relatively complex, and causes relatively high overheads.

SUMMARY

Embodiments provide a memory management method and apparatus to resolve problems of high implementation complexity and relatively high overheads.

According to a first aspect, an embodiment provides a memory management method, including: determining that available storage space of a first memory in a network device is less than a first threshold, where the first threshold is greater than 0, and the first memory stores a first packet queue; and deleting at least one packet at the tail of the first packet queue from the first memory based on that the available storage space of the first memory is less than the first threshold.

According to the foregoing solution, when the available storage space of the first memory is less than the first threshold, a packet queue, namely, the first packet queue is selected and a packet at the tail of the packet queue is deleted from the first memory. Therefore, complexity of packet queue management is relatively low, and overheads are relatively low.

For example, the first memory or a second memory described in this embodiment may be specifically a buffer.

In a possible design, the first packet queue is one of a plurality of packet queues stored in the first memory, a parameter value of the first packet queue is greater than a parameter value of another packet queue in the plurality of packet queues, a parameter value of a packet queue is a latency of the packet queue or a length of the packet queue, and the latency of the packet queue is duration in which a packet at the tail of the packet queue is expected to stay in the packet queue.

In the foregoing design, a packet queue with a largest parameter value is selected as the first packet queue, and a packet at the tail of the first packet queue with the largest parameter value is deleted, so that a packet with a relatively high latency can be prevented from occupying a resource of the first memory for a long time to some extent, and utilization of the first memory can be improved. In addition, a packet loss of a subsequent packet with a low latency that is caused because the memory is full can be avoided to some extent, and a packet loss rate can be reduced.

In a possible design, the network device stores a queue information table, and the queue information table records the parameter value of the first packet queue and an identifier of the first packet queue; and the deleting at least one packet at the tail of the first packet queue from the first memory includes: determining the first packet queue based on the identifier of the first packet queue that is recorded in the queue information table, and deleting the at least one packet at the tail of the first packet queue from the first memory.

In the foregoing design, that the queue information table records a parameter value of a packet queue is simple and easy to implement, and has low complexity.

In a possible design, the network device includes a second memory, and a bandwidth of the second memory is less than a bandwidth of the first memory; and after the determining that available storage space of a first memory in a network device is less than a first threshold, the method further includes: storing the at least one packet at the tail of the first packet queue in the second memory, and updating the parameter value of the first packet queue that is recorded in the queue information table, where when the parameter value of the first packet queue is a latency of the first packet queue, an updated parameter value of the first packet queue is duration in which a first packet is expected to stay in the first packet queue starting from a time at which the at least one packet is deleted from the first memory, the first packet is a packet in the first packet queue, the first packet is adjacent to the at least one packet, and the first packet is located before the at least one packet; or when the parameter value of the first packet queue is a length of the first packet queue, an updated parameter value of the first packet queue is a length of the first packet queue that is stored in the first memory and from which the at least one packet is deleted.

In the foregoing design, when a parameter value is calculated based on a packet at the tail of a packet queue stored in the first memory, accuracy is relatively high.

It should be understood that, in this embodiment, a bandwidth of a memory is a rate at which data is stored or written in the memory, or a rate at which data is read from the memory. That the bandwidth of the second memory is less than the bandwidth of the first memory means that a rate at which data is stored in the first memory is greater than a rate at which data is stored in the second memory, or a rate at which data is read from the first memory is greater than a rate at which data is read from the second memory.

In a possible design, the method further includes: storing an identifier of the first packet in the queue information table.

In the foregoing design, the identifier of the first packet at the tail of the first packet queue stored in the first memory is stored in the queue information table, so that a packet at the tail of the first packet queue stored in the first memory is subsequently deleted.

In a possible design, the method further includes: receiving a second packet; enqueuing the second packet into a second packet queue; determining a parameter value of the second packet queue that is obtained when the second packet is located at the tail of the second packet queue; and when the parameter value of the second packet queue that is obtained when the second packet is located at the tail of the second packet queue is greater than the parameter value of the first packet queue that is recorded in the queue information table, replacing the identifier of the first packet queue that is recorded in the queue information table with an identifier of the second packet queue, and replacing the parameter value of the first packet queue that is recorded in the queue information table with the parameter value of the second packet queue.

In the foregoing design, when a packet is enqueued, the queue information table is updated in real time, so that when the first packet queue is selected based on a parameter value of a packet queue, complexity is low, and accuracy is relatively high.

In a possible design, the network device includes a second memory, a bandwidth of the second memory is less than a bandwidth of the first memory, and the first memory further stores a third packet queue; after the determining that available storage space of a first memory in a network device is less than a first threshold, the method further includes: storing the at least one packet at the tail of the first packet queue in the second memory; and after the deleting at least one packet at the tail of the first packet queue from the first memory based on that the available storage space of the first memory is less than the first threshold, the method further includes: determining that the available storage space of the first memory is less than a second threshold, where the second threshold is less than the first threshold, and the second threshold is greater than 0; and deleting at least one packet at the tail of the third packet queue from the first memory based on that the available storage space of the first memory is less than the second threshold, and avoiding storing the at least one packet at the tail of the third packet queue in the second memory.

In the foregoing design, when storage space of the first memory is severely insufficient, in other words, is less than the second threshold, one packet queue is selected for a migration operation (the packet queue is deleted from the first memory and stored in the second memory), and another packet queue is selected for a deletion operation, so that the storage space of the first memory can be saved more quickly for a new packet with a relatively small parameter value. In this way, utilization of the first memory can be improved, and a packet loss rate can be reduced.

In a possible design, after the deleting at least one packet at the tail of the first packet queue from the first memory, the method further includes: receiving a third packet to be enqueued into the first packet queue; and when the first packet queue meets at least one of a first condition or a second condition, storing the third packet in the second memory; or when the first packet queue meets neither a first condition nor a second condition, storing the third packet in the first memory, where the first condition is: when it is determined whether the third packet is enqueued into the first packet queue, a length of the first packet queue stored in the first memory and the second memory is less than a third threshold, where the third threshold is greater than 0; and the second condition is: when it is determined whether the third packet is enqueued into the first packet queue, duration in which a packet at the tail of the first packet queue stored in the first memory and the second memory is expected to stay in the first packet queue is less than a fourth threshold, where the fourth threshold is greater than 0.

In the foregoing design, for a packet that is newly enqueued into the first packet queue (on which migration or deletion processing is performed), when the first packet queue is relatively long or a latency of the first packet queue is relatively high, the newly enqueued packet is directly stored in the second memory, to provide sufficient space for a new packet with a relatively small parameter value. Therefore, utilization of the first memory can be improved, and a packet loss rate can be reduced.

In a possible design, after the deleting at least one packet at the tail of the first packet queue from the first memory, the method further includes: receiving a third packet to be enqueued into the first packet queue; and when the first packet queue meets at least one of a first condition and a second condition, avoiding storing the third packet in the first memory; or when the first packet queue meets neither a first condition nor a second condition, storing the third packet in the first memory, where the first condition is: when it is determined whether the third packet is enqueued into the first packet queue, a length of the first packet queue stored in the first memory and the second memory is less than a third threshold, where the third threshold is greater than 0; and the second condition is: when it is determined whether the third packet is enqueued into the first packet queue, duration in which a packet at the tail of the first packet queue stored in the first memory and the second memory is expected to stay in the first packet queue is less than a fourth threshold, where the fourth threshold is greater than 0.

In the foregoing design, for a packet that is newly enqueued into the first packet queue (on which migration or deletion processing is performed), when the first packet queue is relatively long or a latency of the first packet queue is relatively high, the newly enqueued packet is directly discarded, to provide sufficient space for a new packet with a relatively small parameter value. Therefore, utilization of the first memory can be improved, and a packet loss rate can be reduced.

In a possible design, the first packet queue is one of a plurality of packet queues included in a first packet queue set, a parameter value of each packet queue in the first packet queue set is greater than a parameter value of each of a plurality of packet queues included in a second packet queue set, all packet queues in the first packet queue set are stored in the first memory, all packet queues in the second packet queue set are stored in the first memory, and the network device stores an identifier of the first packet queue set and an identifier of the second packet queue set; a parameter value of a packet queue is a latency of the packet queue or a length of the packet queue, and the latency of the packet queue is duration in which a packet at the tail of the packet queue is expected to stay in the packet queue; and the deleting at least one packet at the tail of the first packet queue from the first memory based on that the available storage space of the first memory is less than the first threshold includes: determining the first packet queue based on the stored identifier of the first packet queue set; and deleting the at least one packet at the tail of the first packet queue from the first memory.

In the foregoing design, a packet queue with a relatively large parameter value in a set is selected as the first packet queue, and a packet at the tail of the selected first packet queue is deleted, so that a packet with a relatively high latency can be prevented from occupying a resource of the first memory for a long time to some extent, and utilization of the first memory can be improved. In addition, a packet loss of a subsequent packet with a low latency that is caused because the memory is full can be avoided to some extent, and a packet loss rate can be reduced.

In a possible design, the network device stores a first linked list corresponding to the first packet queue set, a plurality of nodes included in the first linked list are in a one-to-one correspondence with the plurality of packet queues in the first packet queue set, and each node in the first linked list includes an identifier of a corresponding packet queue; and the determining the first packet queue based on the stored identifier of the first packet queue set includes: determining the first linked list based on the stored identifier of the first packet queue set; and determining the first packet queue based on an identifier of the first packet queue in the first linked list.

That packet queues in a set are serially connected by using a linked list is simple and easy to implement, and has low complexity.

According to a second aspect, an embodiment provides a memory management apparatus, including: a determining unit configured to determine that available storage space of a first memory in a network device is less than a first threshold, where the first threshold is greater than 0, and the first memory stores a first packet queue; and a management unit configured to delete at least one packet at the tail of the first packet queue from the first memory based on that the available storage space of the first memory is less than the first threshold.

In a possible design, the first packet queue is one of a plurality of packet queues stored in the first memory, a parameter value of the first packet queue is greater than a parameter value of another packet queue in the plurality of packet queues, a parameter value of a packet queue is a latency of the packet queue or a length of the packet queue, and the latency of the packet queue is duration in which a packet at the tail of the packet queue is expected to stay in the packet queue.

In a possible design, the network device stores a queue information table, and the queue information table records the parameter value of the first packet queue and an identifier of the first packet queue; and the management unit is further configured to: determine the first packet queue based on the identifier of the first packet queue that is recorded in the queue information table, and delete the at least one packet at the tail of the first packet queue from the first memory.

In a possible design, the network device includes a second memory, and a bandwidth of the second memory is less than a bandwidth of the first memory; and the management unit is further configured to: after the determining unit determines that the available storage space of the first memory in the network device is less than the first threshold, store the at least one packet at the tail of the first packet queue in the second memory, and update the parameter value of the first packet queue that is recorded in the queue information table, where when the parameter value of the first packet queue is a latency of the first packet queue, an updated parameter value of the first packet queue is duration in which a first packet is expected to stay in the first packet queue starting from a time at which the at least one packet is deleted from the first memory, the first packet is a packet in the first packet queue, the first packet is adjacent to the at least one packet, and the first packet is located before the at least one packet; or when the parameter value of the first packet queue is a length of the first packet queue, an updated parameter value of the first packet queue is a length of the first packet queue that is stored in the first memory and from which the at least one packet is deleted.

In a possible design, the management unit is further configured to store an identifier of the first packet in the queue information table.

In a possible design, the apparatus further includes: a receiving unit configured to receive a second packet, where the management unit is further configured to: enqueue the second packet into a second packet queue; determine a parameter value of the second packet queue that is obtained when the second packet is located at the tail of the second packet queue; and when the parameter value of the second packet queue that is obtained when the second packet is located at the tail of the second packet queue is greater than the parameter value of the first packet queue that is recorded in the queue information table, replace the identifier of the first packet queue that is recorded in the queue information table with an identifier of the second packet queue, and replace the parameter value of the first packet queue that is recorded in the queue information table with the parameter value of the second packet queue.

In a possible design, the network device includes a second memory, a bandwidth of the second memory is less than a bandwidth of the first memory, and the first memory further stores a third packet queue; the management unit is further configured to: after the determining unit determines that the available storage space of the first memory in the network device is less than the first threshold, store the at least one packet at the tail of the first packet queue in the second memory; the determining unit is further configured to: after the management unit deletes the at least one packet at the tail of the first packet queue from the first memory based on that the available storage space of the first memory is less than the first threshold, determine that the available storage space of the first memory is less than a second threshold, where the second threshold is less than the first threshold, and the second threshold is greater than 0; and the management unit is further configured to: delete at least one packet at the tail of the third packet queue from the first memory based on that the available storage space of the first memory is less than the second threshold, and avoid storing the at least one packet at the tail of the third packet queue in the second memory.

In a possible design, the apparatus further includes: a receiving unit configured to: after the management unit deletes the at least one packet at the tail of the first packet queue from the first memory, receive a third packet to be enqueued into the first packet queue, where the management unit is further configured to: when the first packet queue meets at least one of a first condition and a second condition, store the third packet in the second memory; or when the first packet queue meets neither a first condition nor a second condition, store the third packet in the first memory, where the first condition is: when it is determined whether the third packet is enqueued into the first packet queue, a length of the first packet queue stored in the first memory and the second memory is less than a third threshold, where the third threshold is greater than 0; and the second condition is: when it is determined whether the third packet is enqueued into the first packet queue, duration in which a packet at the tail of the first packet queue stored in the first memory and the second memory is expected to stay in the first packet queue is less than a fourth threshold, where the fourth threshold is greater than 0.

In a possible design, the apparatus further includes: a receiving unit configured to: after the management unit deletes the at least one packet at the tail of the first packet queue from the first memory, receive a third packet to be enqueued into the first packet queue, where the management unit is further configured to: when the first packet queue meets at least one of a first condition and a second condition, avoid storing the third packet in the first memory; or when the first packet queue meets neither the first condition nor the second condition, store the third packet in the first memory, where the first condition is: when it is determined whether the third packet is enqueued into the first packet queue, a length of the first packet queue stored in the first memory and the second memory is less than a third threshold, where the third threshold is greater than 0; and the second condition is: when it is determined whether the third packet is enqueued into the first packet queue, duration in which a packet at the tail of the first packet queue stored in the first memory and the second memory is expected to stay in the first packet queue is less than a fourth threshold, where the fourth threshold is greater than 0.

In a possible design, the first packet queue is one of a plurality of packet queues included in a first packet queue set, a parameter value of each packet queue in the first packet queue set is greater than a parameter value of each of a plurality of packet queues included in a second packet queue set, all packet queues in the first packet queue set are stored in the first memory, all packet queues in the second packet queue set are stored in the first memory, and the network device stores an identifier of the first packet queue set and an identifier of the second packet queue set; a parameter value of a packet queue is a latency of the packet queue or a length of the packet queue, and the latency of the packet queue is duration in which a packet at the tail of the packet queue is expected to stay in the packet queue; and the management unit is further configured to: determine the first packet queue based on the stored identifier of the first packet queue set; and delete the at least one packet at the tail of the first packet queue from the first memory.

In a possible design, the network device stores a first linked list corresponding to the first packet queue set, a plurality of nodes included in the first linked list are in a one-to-one correspondence with the plurality of packet queues in the first packet queue set, and each node in the first linked list includes an identifier of a corresponding packet queue; and when determining the first packet queue based on the stored identifier of the first packet queue set, the management unit is further configured to: determine the first linked list based on the stored identifier of the first packet queue set; and determine the first packet queue based on an identifier of the first packet queue in the first linked list.

According to a third aspect, an apparatus is provided. The apparatus may be configured to perform the method provided in the first aspect or any possible design of the first aspect. The apparatus includes a processor and a memory coupled to the processor. The memory stores a computer program. When the processor executes the computer program, the apparatus is enabled to perform the method provided in the first aspect or any possible design of the first aspect.

According to a fourth aspect, a computer-readable storage medium is provided. The computer-readable storage medium is configured to store a computer program. When the computer program is executed, a computer may be enabled to perform the method provided in the first aspect or any possible design of the first aspect.

In a possible design, the computer-readable storage medium may be a non-volatile computer-readable storage medium.

In a possible design, the computer may be a network device.

In a possible design, the network device may be a forwarding apparatus. The forwarding apparatus may be a router, a network switch, a firewall, or a load balancer.

According to a fifth aspect, a computer program product is provided. The computer program product includes a computer program. When the computer program is executed, a computer may be enabled to perform the method provided in the first aspect or any possible design of the first aspect.

DESCRIPTION OF EMBODIMENTS

In the data communications field, a packet may arrive at a destination only after being forwarded by a plurality of forwarding apparatuses. The forwarding apparatus may be a router. The router may forward an Internet Protocol (IP) packet. The forwarding apparatus may be a network switch. The network switch may forward an Ethernet frame. The forwarding apparatuses may alternatively be a firewall, a load balancer, or the like. A network device mentioned in the embodiments may be a forwarding apparatus.

Figure 1:
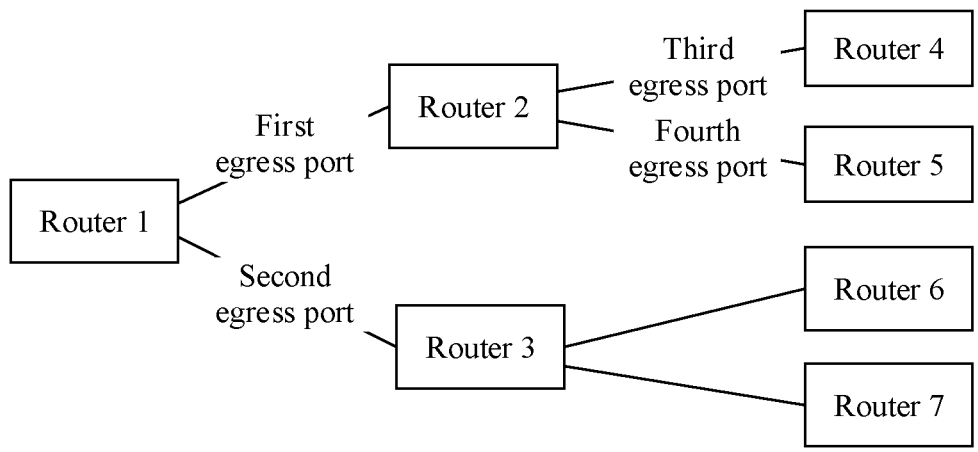
FIG. 1 is a structural diagram of networking according to an embodiment.

FIG. 1 is a structural diagram of networking according. Referring to FIG. 1, the structural diagram of networking includes seven routers, which are respectively a router 1 to a router 7. Each router may include a plurality of physical interface cards. Each physical interface card may include a plurality of ports. FIG. 1 shows two egress ports (a first egress port and a second egress port) on the router 1 and two egress ports (a third egress port and a fourth egress port) on the router 2. The router 1 is connected to the router 2 through the first egress port. The router 1 is connected to the router 3 through the second egress port. The router 2 is connected to the router 4 through the third egress port. The router 2 is connected to the router 5 through the fourth egress port.

After the router 1 receives a packet, the router 1 determines an egress port for forwarding the packet, for example, the first egress port, and forwards the packet from the first egress port. After the router 2 receives the packet forwarded by the router 1, the router 2 determines an egress port for forwarding the packet, for example, the third egress port, and forwards the packet from the third egress port.

Figure 2:
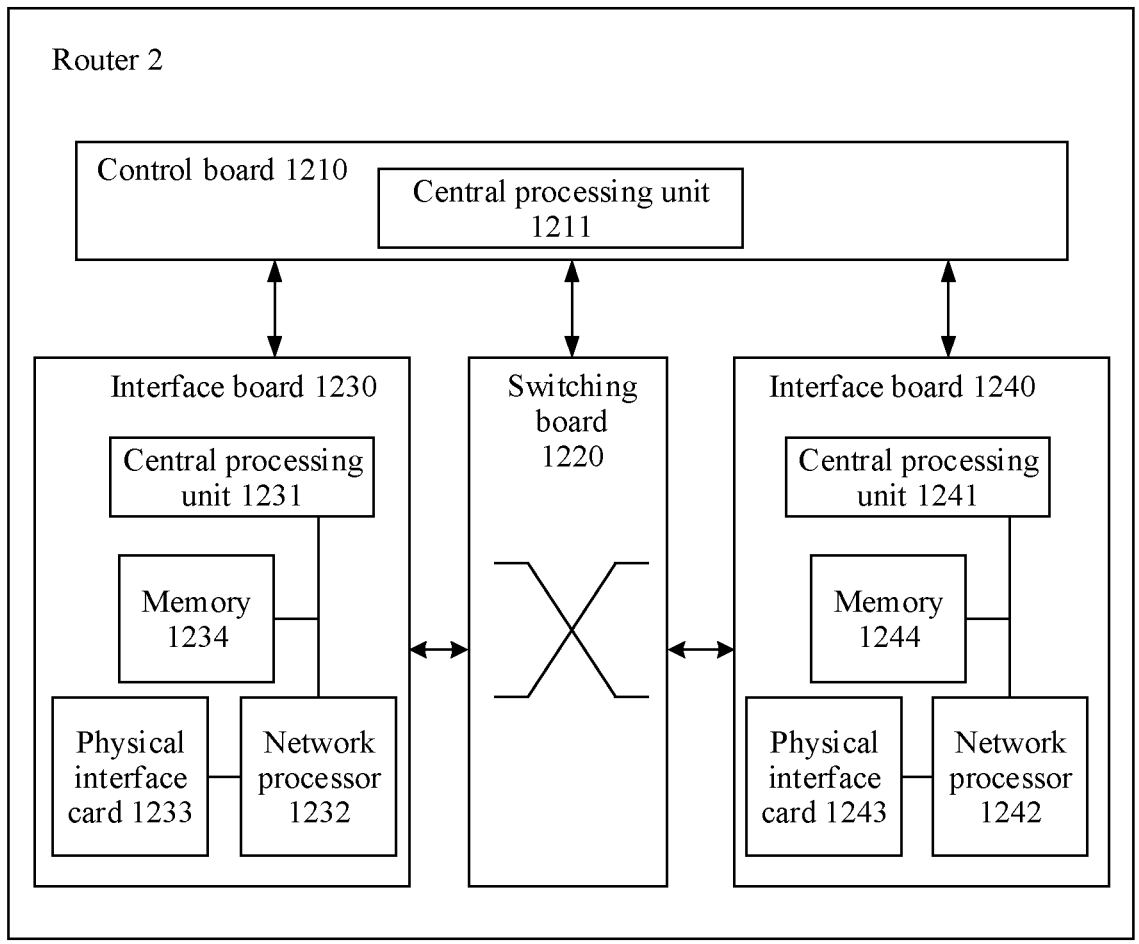
FIG. 2 is a schematic structural diagram of a router according to an embodiment.

FIG. 2 is a possible schematic structural diagram of the router 2 in FIG. 1. Another router (for example, the router 1) in FIG. 1 may also use the schematic structural diagram shown in FIG. 2.

Referring to FIG. 2, the router 2 includes a control board 1210, a switching board 1220, an interface board 1230, and an interface board 1240. The control board 1210 includes a central processing unit (CPU) 1211. The control board 1210 may be configured to execute a routing protocol. The routing protocol may be the Border Gateway Protocol (BGP) or the Interior Gateway Protocol (IGP). The control board 1210 may generate a routing table by executing the routing protocol, and send the routing table to the interface boards 1230 and 1240. It should be noted that the router 2 in FIG. 1 may alternatively use a structure different from the structure shown in FIG. 2. For example, the router 2 in FIG. 1 may include only one control board and one interface board, but includes no switching board. Certainly, the router 2 in FIG. 1 may include at least two interface boards. When the router 2 includes only one interface board, but includes no switching board, after being processed by the interface board, an IP packet received through an ingress port of the interface board may be sent through an egress port of the interface board. When the router 2 includes a plurality of interface boards, and includes a switching board, after being processed by the switching board, an IP packet received through an ingress port of an interface board of the router 2 may be sent through an egress port of another interface board of the router 2. Specific structures of the router 2 and the other router in FIG. 1 are not limited in this disclosure.

The interface board 1230 may forward the IP packet by searching the routing table. Specifically, the interface board 1230 includes a CPU 1231, a network processor 1232, a physical interface card 1233, and a memory 1234. It should be noted that FIG. 2 does not show all components that can be included in the interface board 1230. During specific implementation, the interface board 1230 may further include another component. For example, to enable the interface board 1230 to have a queue scheduling and management function, the interface board 1230 may further include a traffic manager. In addition, to enable a packet from the interface board 1230 to be switched to the interface board 1240 by using the switching board 1220, the interface board 1230 may further include an ingress fabric interface chip (iFIC). For a specific implementation of the interface board 1230 including the traffic manager and the iFIC, refer to FIG. 3 and corresponding descriptions. The CPU 1231 may receive a routing table sent by the CPU 1211, and store the routing table in the memory 1234. The physical interface card 1233 may be configured to receive an IP packet sent by the router 1. The network processor 1232 may search the routing table in the memory 1234 for a routing entry that matches the IP packet received by the physical interface card 1233, and send the IP packet to the switching board 1220 based on the matched routing entry. The switching board 1220 may be configured to switch an IP packet from an interface board to another interface board. For example, the switching board 1220 may switch an IP packet from the interface board 1230 to the interface board 1240. Specifically, the switching board 1220 may switch the IP packet from the interface board 1230 to the interface board 1240 through cell switching. For example, the network processor 1232 may obtain a destination IP address in the IP packet. The network processor 1232 may search, based on a longest prefix match algorithm, the routing table for a routing entry that matches the IP packet, and determine an egress port based on the routing entry that matches the IP packet. The routing entry that matches the IP packet includes an identifier of the egress port. Before the IP packet sent by the network processor 1232 to the switching board 1220 arrives at the switching board 1220, the interface board 1230 may perform queue scheduling and management on the IP packet. Specifically, the interface board 1230 may perform queue scheduling and management on the IP packet by using a traffic manager 301 in FIG. 3.

The interface board 1240 may forward the IP packet by searching the routing table. The interface board 1240 includes a CPU 1241, a network processor 1242, a physical interface card 1243, and a memory 1244. FIG. 2 does not show all components that can be included in the interface board 1240. During specific implementation, the interface board 1240 may further include another component. For example, to enable the interface board 1240 to have a queue scheduling and management function, the interface board 1240 may further include a traffic manager. In addition, to enable the interface board 1240 to correctly receive a packet from the interface board 1230 by using the switching board 1220, the interface board 1240 may further include an egress fabric interface chip (eFIC). For a specific implementation of the interface board 1240 including the traffic manager and the eFIC, refer to FIG. 4 and corresponding descriptions. The CPU 1241 may receive a routing table sent by the CPU 1211, and store the routing table in the memory 1244. The network processor 1242 may be configured to receive an IP packet from the switching board 1220. The IP packet from the switching board 1220 may be an IP packet sent by the router 1 and received by the physical interface card 1233. The network processor 1242 may search the routing table in the memory 1244 for a routing entry that matches the IP packet from the switching board 1220, and send the IP packet to the physical interface card 1243 based on the matched routing entry. The physical interface card 1243 may be configured to send an IP packet to the router 4. Before the IP packet sent by the network processor 1242 to the physical interface card 1243 arrives at the physical interface card 1243, the interface board 1240 may perform queue scheduling and management on the IP packet. Specifically, the interface board 1240 may perform queue scheduling and management on the IP packet by using a traffic manager 402 in FIG. 4.

A plurality of packets needs to be transmitted in a network, and sending times of the packets may be different. To reduce a possibility that the packets transmitted in the network are disordered, a router includes a memory. The memory may be a first in first out memory. The router may perform queue scheduling and management on a to-be-forwarded packet by using the memory. In addition, the router may receive a large quantity of packets within a short time, and the large quantity of packets may cause relatively high congestion of a first in first out queue in the memory of the router. To alleviate congestion of the first in first out queue, the router may discard a packet to be enqueued into the first in first out queue.

Figure 3:
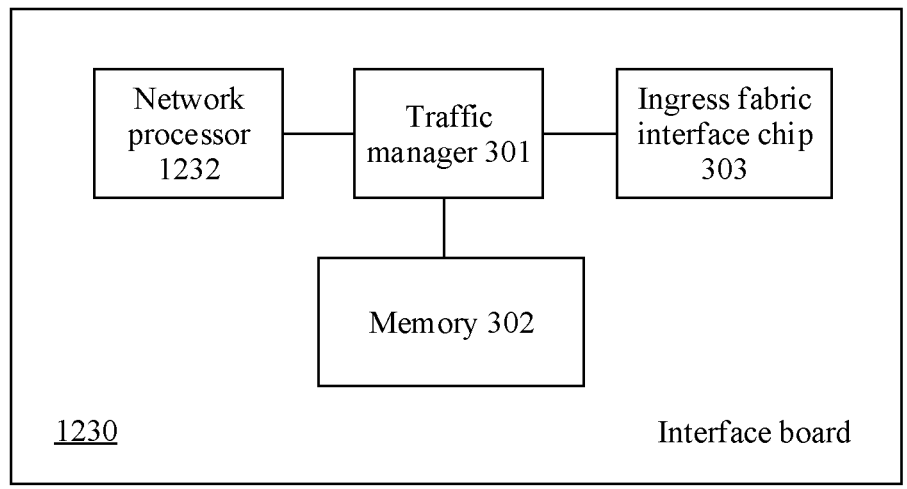
FIG. 3 is a schematic structural diagram of an interface board according to an embodiment.

FIG. 3 is a schematic structural diagram of the interface board 1230 shown in FIG. 2 in a possible implementation. Referring to FIG. 3, the interface board 1230 includes the network processor (NP) 1232, a traffic manager (TM) 301, a memory 302, and an iFIC 303. It should be noted that FIG. 3 shows only some components included in the interface board 1230. During specific implementation, the interface board 1230 shown in FIG. 3 may further include the component in the interface board 1230 shown in FIG. 2. The interface board shown in FIG. 3 can perform queue scheduling and management on uplink traffic. The uplink traffic may be traffic that is received by the interface board 1230 by using the physical interface card 1233 and that is to be sent to the switching board 1220. Specifically, after being processed by the network processor 1232 and the traffic manager 301, a packet received by using the physical interface card 1233 is sent to the ingress fabric interface chip 303. After the ingress fabric interface chip 303 receives a packet sent by the traffic manager 301, the ingress fabric interface chip 303 may generate a plurality of cells based on the packet, and send the plurality of cells to the switching board 1220. Packet processing performed by the traffic manager 301 may include enqueuing processing and dequeuing processing. For example, the traffic manager 301 may store a packet in the memory 302 to perform enqueuing processing on the packet. The traffic manager 301 may delete a packet stored in the memory 302 to perform dequeuing processing on the packet. The memory 302 may be configured to store and maintain a packet queue. The packet queue includes a plurality of packets. The packet queue may be a first in first out queue. The memory 302 may be a first in first out memory. The traffic manager 301 can perform enqueuing management on a packet that is to enter the packet queue, and perform dequeuing management on a packet that is to leave the packet queue. Specifically, the traffic manager 301 can store and maintain a packet descriptor queue. The packet descriptor queue includes a plurality of packet descriptors. The plurality of packets included in the packet queue are in a one-to-one correspondence with the plurality of packet descriptors included in the packet descriptor queue. Each packet descriptor is used to indicate information about a corresponding packet. For example, the packet descriptor may include a storage location, in the memory 302, of a packet corresponding to the packet descriptor. In addition, the packet descriptor may further include a time at which the packet corresponding to the packet descriptor enters the router 2. Specifically, the time at which the packet corresponding to the packet descriptor enters the router 2 may be a time at which the packet corresponding to the packet descriptor is received by the physical interface card 1233. In addition, the packet descriptor may further include a length of the packet queue when the packet corresponding to the packet descriptor is enqueued into the packet queue. For example, when a packet 1 is enqueued into a packet queue 1, the packet queue 1 includes a packet 2, a packet 3, and a packet 4. The packet 2 has 100 bits, the packet 3 has 200 bits, and the packet 4 has 300 bits. Therefore, when the packet 1 is enqueued into the packet queue 1, a length of the packet queue 1 is 600 bits. It can be learned that, when the packet 1 is enqueued into the packet queue 1, the packet queue 1 does not include the packet 1. The packet descriptor may further include duration in which the packet corresponding to the packet descriptor is expected to stay in the packet queue after the packet corresponding to the packet descriptor is enqueued into the packet queue. For ease of description, the duration is referred to as a latency of the packet queue in this embodiment.

The traffic manager 301 can perform enqueuing management on a packet from the network processor 1232. For example, the traffic manager 301 may determine, based on a weighted random early detection (WRED) algorithm, whether to discard the packet from the network processor 1232. Certainly, the traffic manager 301 may also determine, based on another algorithm, whether to discard the packet from the network processor 1232. If the traffic manager 301 determines not to discard the packet from the network processor 1232, the traffic manager 301 may store the packet in the packet queue in the memory 302. Specifically, the traffic manager 301 may store the packet at the tail of the packet queue in the memory 302. In addition, the traffic manager 301 generates, based on a storage location of the packet in the memory 302, a packet descriptor corresponding to the packet, and stores the packet descriptor in the packet descriptor queue. Specifically, the traffic manager 301 may store the packet descriptor at the tail of the packet descriptor queue. The packet descriptor queue may be stored in the traffic manager 301. Specifically, the packet descriptor queue may be stored in a queue manager in the traffic manager 301. The traffic manager 301 can perform dequeuing management on the packet queue stored in the memory 302. For example, when the traffic manager 301 determines, based on weighted fair queuing (WFQ) algorithm, that a packet in the packet queue stored in the memory 302 needs to be sent, the traffic manager 301 may send a scheduling signal to the memory 302 based on the head of the packet descriptor queue. Certainly, the traffic manager 301 may also determine, based on another queue scheduling algorithm, that the packet in the packet queue stored in the memory 302 needs to be sent. The scheduling signal includes a storage location of a packet at the head of the packet queue. The scheduling signal is used to instruct the memory 302 to provide the packet at the head of the packet queue for the traffic manager 301. The memory 302 provides the packet at the head of the packet queue for the traffic manager 301, and deletes the sent packet in the packet queue. The traffic manager 301 obtains the packet at the head of the packet queue from the memory 302, and sends the packet to the ingress fabric interface chip 303. After the traffic manager 301 sends the packet to the ingress fabric interface chip 303, the traffic manager 301 deletes a packet descriptor corresponding to the sent packet from the packet descriptor queue. In the foregoing example, the packet queue is stored in the memory 302.

In a possible design, the traffic manager 301 and the memory 302 may be encapsulated in a same chip. When the traffic manager 301 and the memory 302 are encapsulated in a same chip, the memory 302 may be referred to as an on-chip memory. A working frequency of the traffic manager 301 may be equal to a working frequency of the memory 302. The on-chip memory may also be referred to as a high-speed memory. Optionally, in this design, a memory may be further disposed outside the chip. The memory disposed outside the chip may be referred to as an off-chip memory, and a bandwidth of the on-chip memory is greater than a bandwidth of the off-chip memory. The off-chip memory may also be referred to as a low-speed memory.

In another possible design, the traffic manager 301 and the memory 302 may be encapsulated in different chips. When the traffic manager 301 and the memory 302 are encapsulated in different chips, the memory 302 may be referred to as an off-chip memory. A working frequency of the traffic manager 301 may be greater than a working frequency of the memory 302. Optionally, a memory is disposed inside the traffic manager 301, and a bandwidth of the memory disposed inside the traffic manager 301 is greater than a bandwidth of the memory 302. The on-chip memory may also be referred to as a low-speed memory.

It should be understood that, in this embodiment, a bandwidth of a memory is a rate at which data is stored or written in the memory, or a rate at which data is read from the memory. That a bandwidth of a memory 1 is greater than a bandwidth of a memory 2 means that a rate at which data is stored in the memory 1 is greater than a rate at which data is stored in the memory 2, or a rate at which data is read from the memory 1 is greater than a rate at which data is read from the memory 2.

In addition to the traffic manager 301 and the memory 302, the interface board 1230 may further include another circuit having a storage function. For example, the interface board 1230 may further include the memory 1234. Functions of the memory 1234 and the memory 302 are different. The memory 1234 is configured to store a routing table. The network processor 1232 searches the routing table by accessing the memory 1234. The memory 302 is configured to store a first in first out queue. The traffic manager 301 manages the first in first out queue by accessing the memory 302. The memory 1234 and the memory 302 may be independent memories. In a possible implementation, the memory 1234 and the memory 302 may be included in one chip. Alternatively, only one of the memory 302 and the memory 1234 may be included.

Figure 4:
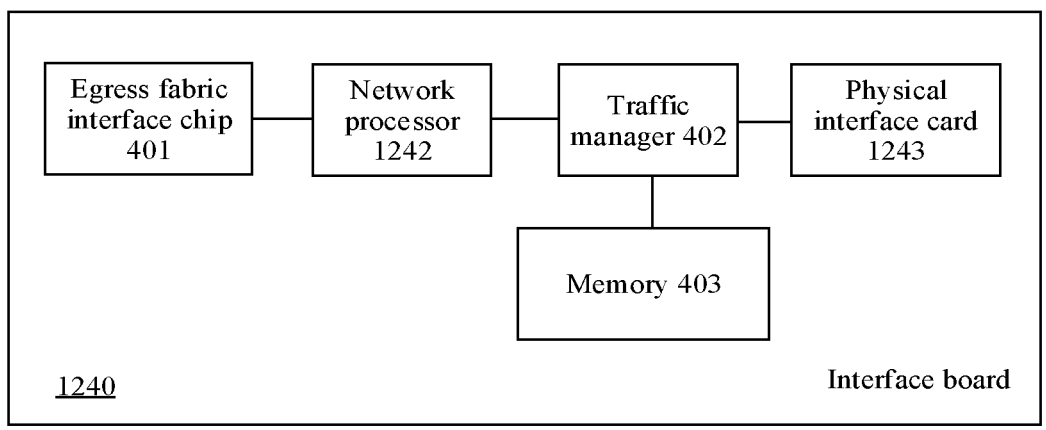
FIG. 4 is a schematic structural diagram of an interface board according to an embodiment.

FIG. 4 is a schematic structural diagram of the interface board 1240 shown in FIG. 2 in a possible implementation. Referring to FIG. 4, the interface board 1240 includes a network processor 1242, a traffic manager 402, a memory 403, a physical interface card 1243, and an eFIC 401. It should be noted that FIG. 4 shows only some components included in the interface board 1240. During specific implementation, the interface board 1240 shown in FIG. 4 may further include the component in the interface board 1240 shown in FIG. 2. The interface board shown in FIG. 4 can perform queue scheduling and management on downlink traffic. The downlink traffic may be traffic that is received by the interface board 1240 by using the switching board 1220 and that is to be sent to the physical interface card 1243. After receiving the downlink traffic, the physical interface card 1243 may send the downlink traffic to the router 4 through the third egress port. After the egress fabric interface chip 401 receives a plurality of cells from the switching board 1220, the egress fabric interface chip 401 can generate a packet based on the plurality of cells, and send the packet to the network processor 1242. The traffic manager 402 can perform discarding management on the packet received by the network processor 1242. The traffic manager 402 can perform enqueuing management on the packet received by the network processor 1242. Specifically, the received packet is placed in a packet queue in the memory 403 based on a scheduling algorithm, for example, is placed at the tail of the packet queue. The traffic manager 402 can perform dequeuing management on the packet queue stored in the memory 403. The packet queue may be a first in first out queue. The memory 403 may be a first in first out memory. After the traffic manager 402 obtains a packet in the packet queue stored in the memory 403, the traffic manager 402 may send the obtained packet to the physical interface card 1243. The physical interface card 1243 may send the packet to the router 4 through the third egress port. For a specific implementation of performing queue scheduling and management by the interface board shown in FIG. 4, refer to descriptions of the embodiment corresponding to FIG. 3. Details are not described herein again.

Figure 5A:
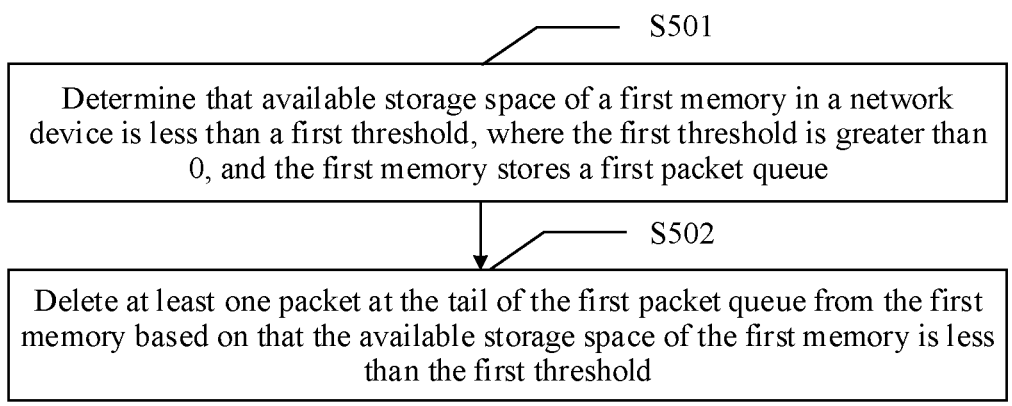
FIG. 5A is a schematic flowchart of a memory management method according to an embodiment.

FIG. 5A is a schematic flowchart of a memory management method according to an embodiment. Referring to FIG. 5A, the method may include S501 and S502. For example, the method shown in FIG. 5A may be performed by a network device. The method shown in FIG. 5A may be performed by the interface board 1230 in the network device shown in FIG. 3. The method shown in FIG. 5A may be performed by the traffic manager 301. In a possible design, the method shown in FIG. 5A may alternatively be performed by the interface board 1240 in the network device shown in FIG. 4. The method shown in FIG. 5A may be performed by the traffic manager 402. Certainly, the method shown in FIG. 5A may also be performed by another software and hardware system. S501. Determine that available storage space of a first memory in the network device is less than a first threshold, where the first threshold is greater than 0, and the first memory stores a first packet queue.

For example, the first threshold is equal to $1/3$, $1/4$, $1/5$, $1/6$, or the like of total storage space of the first memory, or may be set in another manner. The first threshold may be set based on an actual situation. The network device in S501 may be the network device shown in FIG. 3.

For example, a traffic manager may detect an occupation status of a memory. For example, the traffic manager may pre-store total storage space of the memory. When no data is stored in the memory, the traffic manager may determine that available storage space of the memory is equal to the total storage space. When the traffic manager performs a write operation on the memory, the traffic manager may determine that the available storage space of the memory is equal to a value obtained by subtracting a size of data corresponding to the write operation from the total storage space. When the traffic manager performs a read operation on the memory, the traffic manager may determine that the available storage space of the memory is equal to a value obtained by adding latest determined available storage space to a size of data corresponding to the read operation. When the traffic manager performs a deletion operation on the memory, the traffic manager may determine that the available storage space of the memory is equal to a value obtained by adding latest determined available storage space to a size of data corresponding to the deletion operation. It may be understood that the traffic manager may enqueue a packet into a packet queue by performing a write operation, may dequeue a packet from the packet queue by performing a read operation, and may delete a packet stored in the memory by performing a deletion operation.

S502. Delete at least one packet at the tail of the first packet queue from the first memory based on that the available storage space of the first memory is less than the first threshold.

Figure 5B:
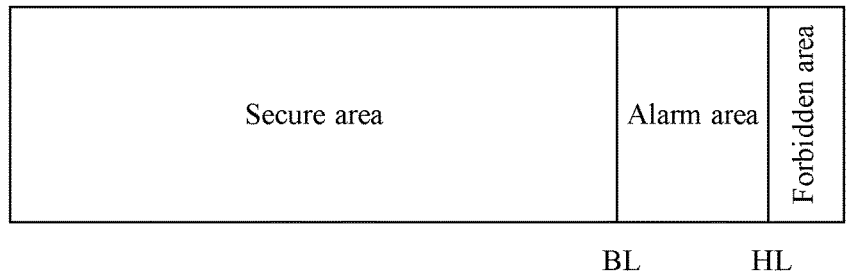
FIG. 5B is a schematic diagram of an alarm area and a forbidden area according to an embodiment.

It should be understood that, that the available storage space of the first memory is less than the first threshold is described from the perspective of the available storage space, and certainly, may be further described from the perspective of used storage space. For example, an alarm area threshold is set based on total storage space of the first memory. As shown in FIG. 5B, BL represents an alarm area threshold, and when the used storage space of the first memory is greater than or equal to the alarm area threshold, the at least one packet at the tail of the first packet queue is deleted from the first memory.

For example, the traffic manager may pre-store the first threshold. The traffic manager may delete a packet stored in the memory by performing a deletion operation.

In this embodiment, a packet queue may be maintained by using one or more memories.

In a first possible example, the packet queue is maintained by using one memory. When the at least one packet at the tail of the first packet queue is deleted from the first memory, the at least one packet at the tail of the first packet queue is directly deleted from the first memory, and is prevented from being stored at another location.

Figure 6A:
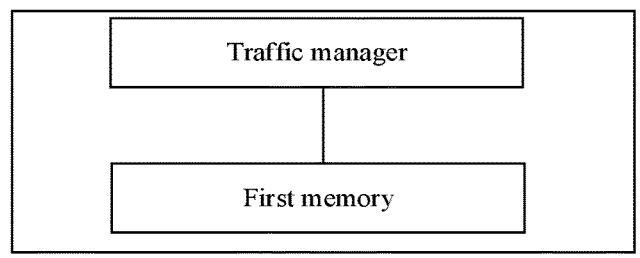
FIG. 6A is a schematic diagram of a relationship between a traffic manager and a first memory according to an embodiment.

For example, when the method shown in FIG. 5A is performed by the traffic manager 301 in the network device, the traffic manager 301 and the first memory may be encapsulated in a same chip, or may be encapsulated in different chips. Referring to a relationship that is between the traffic manager 301 and the first memory and that is shown in FIG. 6A, the traffic manager 301 and the first memory are encapsulated in a same chip. It should be understood that, when the first memory and the traffic manager 301 are encapsulated in a same chip, the first memory may be referred to as a high-speed memory. When the first memory and the traffic manager 301 are encapsulated in different chips, the first memory may be referred to as a low-speed memory. A bandwidth of the low-speed memory is less than a bandwidth of the high-speed memory.

Figure 6B:
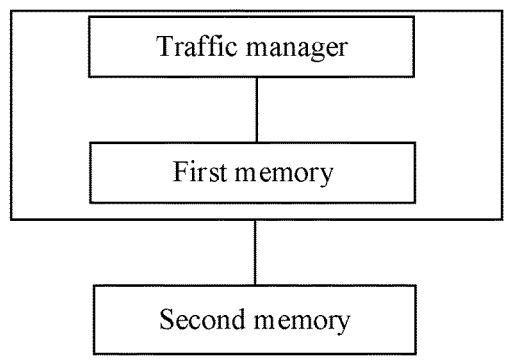
FIG. 6B is another schematic diagram of a relationship between a traffic manager and a first memory according to an embodiment.

In a second possible example, the packet queue may be maintained by using at least two memories. When the at least one packet at the tail of the first packet queue is deleted from the first memory, in other words, the at least one packet at the tail of the first packet queue is migrated from the first memory to a second memory, the at least one packet at the tail of the first packet queue is copied to the second memory, and then the at least one packet at the tail of the first packet is deleted from the first memory. For example, when the method shown in FIG. 5A is performed by the traffic manager 301, the traffic manager 301 and the first memory are encapsulated in a same chip, and the traffic manager 301 and the second memory are encapsulated in different chips. For this, refer to a relationship that is between the traffic manager 301 and the first memory and that is shown in FIG. 6B, and a relationship that is between the traffic manager 301 and the second memory and that is shown in FIG. 6B. A bandwidth of the first memory is greater than a bandwidth of the second memory. The first memory may be referred to as a high-speed memory or an on-chip memory, and the second memory may be referred to as a low-speed memory or an off-chip memory. For example, the first memory may be a static random-access memory (SRAM), and the second memory may be a dynamic random-access memory (DRAM). It should be understood that the first memory and the traffic manager 301 may be encapsulated in different chips, and the second memory and the traffic manager 301 may also be encapsulated in different chips. However, the bandwidth of the first memory is greater than the bandwidth of the second memory.

The first memory and the second memory described in this embodiment may be buffers.

In this embodiment, the first packet queue may be selected from a plurality of maintained packet queues in a plurality of manners. The following two manners are used as an example for description in this embodiment.

In a first possible implementation, a packet queue, namely, the first packet queue, is directly selected from a plurality of packet queues stored in the first memory. A packet queue with a highest latency or a longest packet queue may be selected from the plurality of packet queues. Therefore, the selected first packet queue is one of the plurality of packet queues stored in the first memory, a parameter value of the first packet queue is greater than a parameter value of another packet queue in the plurality of packet queues, a parameter value of a packet queue is a latency of the packet queue or a length of the packet queue, and the latency of the packet queue is duration in which a packet at the tail of the packet queue is expected to stay in the packet queue.

In a second possible implementation, a plurality of packet queues stored in the first memory are classified into a plurality of packet queue sets. Different packet queue sets may correspond to different parameter value intervals, and the parameter value intervals corresponding to the different packet queue sets do not overlap. A parameter value may be a latency of a packet queue or a length of a packet queue. The selected first packet queue may be a packet queue in a packet queue set corresponding to a largest parameter value interval. For example, if the plurality of packet queues stored in the first memory are classified into two packet queue sets, which are respectively a first packet queue set and a second packet queue set, the selected first packet queue is one of a plurality of packet queues included in the first packet queue set. A parameter value of each packet queue in the first packet queue set is greater than a parameter value of each of a plurality of packet queues included in the second packet queue set, all packet queues in the first packet queue set are stored in the first memory, and all packet queues in the second packet queue set are stored in the first memory. A parameter value of a packet queue is a latency of the packet queue or a length of the packet queue, and the latency of the packet queue is duration in which a packet at the tail of the packet queue is expected to stay in the packet queue.

First, the first possible implementation is described in detail. In subsequent descriptions, an example in which the method shown in FIG. 5A is performed by the traffic manager 301 is used.

When determining that the available storage space of the first memory is less than the first threshold, the traffic manager 301 selects a packet queue with a largest parameter value from the plurality of packet queues stored in the first memory, that is, selects a packet queue with a highest latency or a longest packet queue, namely, the first packet queue, from the plurality of packet queues stored in the first memory. In subsequent descriptions, an example in which the parameter value of the packet queue is the latency of the packet queue is used for description.

The subsequently described latency of the packet queue is duration in which the last packet that is in the packet queue and that is stored in the first memory is expected to stay in the packet queue. For example, referring to a packet queue 1 shown in FIG. 7A, an example in which the first packet queue is the packet queue 1 is used, and duration in which a packet N is expected to stay in the packet queue 1 represents a latency of the first packet queue. An example in which the traffic manager 301 shown in FIG. 6B maintains a plurality of packet queues by using two memories is used. Before the packet N is migrated from the first memory to the second memory, a latency of the packet queue 1 is duration in which the packet N is expected to stay in the packet queue 1. An example in which a packet at the tail of the packet queue 1 is deleted is used. When it is determined that the available storage space of the first memory is less than the first threshold, the packet N in the packet queue 1 is migrated from the first memory to the second memory. After the migration, the latency of the packet queue 1 changes into duration in which a packet N−1 is expected to stay in the packet queue 1. For this, refer to FIG. 7B.

It should be understood that there is actually only one packet that is at the tail of the packet queue 1. When a quantity of the at least one packet at the tail of the packet queue 1 is not 1, because another packet is adjacent to the actual packet at the tail of the packet queue 1, the other packet is also considered to be at the tail of the packet queue 1 in this embodiment. For example, an example in which the quantity of the at least one packet is 2 is used, and in FIG.

7A, the packets at the tail of the packet queue 1 in the first memory are the packet N and the packet N−1.

In the following first possible implementation, how to maintain lengths and/or latencies of a plurality of packet queues when the plurality of packet queues is stored only in the first memory is described in detail.

In an example, the traffic manager 301 may maintain a latency and/or a length of each packet queue.

In another example, the traffic manager 301 may maintain latencies and/or lengths of only some packet queues in the first memory. For example, some packet queues are m packet queues with relatively high latencies in the plurality of packet queues stored in the first memory, and m is an integer greater than 0.

For example, the traffic manager 301 may record latencies of the m packet queues with relatively high latencies by using a packet queue information table. The packet queue information table includes identifiers such as QIDs of the m packet queues, and latencies respectively corresponding to the identifiers of the m packet queues. Table 1 is a packet queue information table. An example in which latencies of two packet queues are recorded in Table 1 is used.

TABLE 1

| QID (identifier of a packet queue) | Queue latency (latency of a packet queue) |
| --- | --- |
| Packet queue 1 | 800 microseconds (μs) |
| Packet queue 2 | 780 μs |

When deleting the at least one packet at the tail of the packet queue 1 with a greater latency from the first memory, the traffic manager 301 determines the packet queue 1 based on the identifier of the packet queue 1 that is recorded in the queue information table, and deletes the at least one packet at the tail of the packet queue 1 from the first memory. After deleting the at least one packet at the tail of the packet queue 1 from the first memory, the traffic manager 301 updates the latency of the packet queue 1 in the queue information table. An example in which one packet is deleted from the packet queue 1 is used, and an updated latency of the packet queue 1 is duration in which the packet N−1 is expected to stay in the packet queue 1. When a packet at the head of the packet queue 1 is dequeued from the packet queue 1, the traffic manager 301 also correspondingly modifies the latency of the packet queue 1 in the queue information table. Certainly, for the other packet queue shown in Table 1, when a packet at the head of the other packet queue is dequeued from the other packet queue, the traffic manager 301 also correspondingly updates the latency of the other packet queue in Table 1. The traffic manager 301 maintains the m packet queues with relatively high latencies that are stored in the queue information table. When a latency of a packet queue other than the m packet queues is greater than a lower latency in the queue information table because a packet is enqueued into the packet queue, the lower latency and an identifier of a packet queue corresponding to the lower latency in the queue information table are updated. For example, a packet is enqueued into a packet queue 3, and a latency of the packet queue 3 after the packet is enqueued into the packet queue 3 is 790 μs, in other words, the latency of the packet queue 3 is greater than the latency of the packet queue 2. In this case, the identifier of the packet queue 2 in Table 1 is replaced with an identifier of the packet queue 3, and the latency of the packet queue 2 in Table 1 is replaced with the latency of the packet queue 3.

After the traffic manager 301 deletes the at least one packet at the tail of the packet queue 1 from the first memory, if the available storage space of the first memory is greater than or equal to the first threshold, the traffic manager 301 does not continue to perform a deletion operation. When the available storage space of the first memory is still less than the first threshold, the traffic manager 301 continues to select a packet queue with a greatest latency from the queue information table. For example, after the packet N at the tail of the packet queue 1 is deleted, if the latency of the packet queue 1 is still greater than the latency of the packet queue 2, the packet N−1 at the tail of the packet queue 1 is deleted from the first memory. For example, after the packet N at the tail of the packet queue 1 is deleted, if the latency of the packet queue 2 is greater than the latency of the packet queue 1, a packet at the tail of the packet queue 2 is selected to be deleted from the first memory.

In a possible implementation, after the at least one packet at the tail of the packet queue 1 is deleted from the first memory, a packet 1 to be enqueued into the packet queue 1 is received. When the packet queue 1 meets at least one of a first condition and a second condition, the packet 1 is not stored in the first memory. Alternatively, when the packet queue 1 meets neither the first condition nor the second condition, the packet 1 is stored in the first memory.

The first condition is as follows: Before the packet 1 is enqueued into the packet queue 1, a length of the packet queue 1 stored in the first memory is less than a third threshold, where the third threshold is greater than 0. The second condition is as follows: Before the packet 1 is enqueued into the packet queue 1, duration in which a packet at the tail of the packet queue 1 stored in the first memory is expected to stay in the packet queue 1 is less than a fourth threshold, where the fourth threshold is greater than 0.

After the traffic manager 301 deletes the at least one packet at the tail of the packet queue 1 from the first memory, if the traffic manager 301 receives the packet 1 belonging to the packet queue 1, the traffic manager 301 may directly discard the packet 1 until the entire packet queue 1 becomes shorter (the latency of the packet queue 1 is less than the fourth threshold or the length of the packet queue 1 is less than the third threshold). In this way, it can be ensured to some extent that there is free space to store a packet with a relatively low latency for enqueuing.

The third threshold and the fourth threshold may be preset based on an empirical value. For example, when a length of a packet queue reaches K packets, congestion usually occurs, and the first memory has insufficient space. In this case, the third threshold may be set to K/2, K/3, K/4, or the like. The third threshold and the fourth threshold may alternatively be dynamically set. For example, when it is determined that the packet at the tail of the packet queue 1 is deleted, the latency of the packet queue 1 is X. For example, referring to FIG. 7A, X is equal to duration in which the packet N is expected to stay in the packet queue 1, and the fourth threshold may be set to X/2, X/3, or X/4.

In the following second possible implementation, how to maintain lengths and/or latencies of a plurality of packet queues when the plurality of packet queues is stored in the first memory and the second memory is described in detail.

In an example, the traffic manager 301 may maintain a latency and/or a length of each packet queue stored in the first memory.

In another example, the traffic manager 301 may maintain latencies and/or lengths of only some packet queues in the first memory. For example, some packet queues are w packet queues with relatively high latencies in the plurality of packet queues stored in the first memory, and w is an integer greater than 0.

The latency herein of the packet queue stored in the first memory is duration in which the last packet that is in the packet queue and that is stored in the first memory stays in the packet queue.

For example, the traffic manager 301 may record latencies of the w packet queues with relatively high latencies by using a packet queue information table. Table 2 is a packet queue information table. The packet queue information table includes identifiers such as QIDs of the w packet queues, and the packet queue information table further includes latencies respectively corresponding to the identifiers of the w packet queues. After some packet queues are migrated, packets at the tail of the some packet queues may be migrated to the second memory. Therefore, to facilitate next migration processing, an identifier of the last packet in a packet queue stored in the first memory may be recorded in the packet queue information table. An identifier of a packet may be an ID number of the packet, a storage address of the packet, or the like. An example in which latencies of three packet queues are recorded in Table 2 is used.

TABLE 2

| QID (identifier of a packet queue) | Queue latency (latency of a packet queue) | Last on-chip packet (identifier of the last packet stored in the first memory) |
|---|---|---|
| Packet queue 1 | 800 μs | A |
| Packet queue 2 | 780 μs | B |
| Packet queue 3 | 770 μs | C |

When deleting the at least one packet at the tail of the packet queue 1 from the first memory, the traffic manager 301 determines the packet queue 1 based on the identifier of the packet queue 1 that is recorded in the queue information table, and migrates the at least one packet at the tail of the packet queue 1 from the first memory to the second memory. After migrating the at least one packet at the tail of the packet queue 1 from the first memory to the second memory, the traffic manager 301 updates the latency of the packet queue 1 in the queue information table. An example in which one packet is deleted from the packet queue 1 is used, and an updated latency of the packet queue 1 is duration in which the packet N−1 is expected to stay in the packet queue 1. When a packet at the head of the packet queue 1 is dequeued from the packet queue 1, the traffic manager 301 also correspondingly updates the latency of the packet queue 1 in the queue information table. Certainly, for another packet queue shown in Table 2, when a packet at the head of the other packet queue is dequeued from the other packet queue, the traffic manager 301 also correspondingly updates the latency of the other packet queue in the queue information table. The traffic manager 301 maintains the w packet queues with relatively high latencies that are stored in the queue information table. When a latency of another packet queue is greater than a lowest latency in the queue information table because a packet is enqueued into the other packet queue, the lowest latency and an identifier of a packet queue corresponding to the lowest latency in the queue information table are updated. For example, a packet is enqueued into a packet queue 5, and a latency of the packet queue 5 is 775 μs, in other words, the latency of the packet queue 5 is greater than the latency of the packet queue 3. In this case, the identifier of the packet queue 3 in Table 2 is replaced with an identifier of the packet queue 5, and the latency of the packet queue 3 in Table 2 is replaced with the latency of the packet queue 5.

After the traffic manager 301 deletes the at least one packet at the tail of the packet queue 1 from the first memory, if the available storage space of the first memory is greater than or equal to the first threshold, the traffic manager 301 does not continue to perform a migration operation. When the available storage space of the first memory is still less than the first threshold, the traffic manager 301 continues to select a packet queue with a greatest latency from the queue information table. For example, after the packet N at the tail of the packet queue 1 is migrated from the first memory to the second memory, if the latency of the packet queue 1 is still greater than the latency of the packet queue 2, the packet N−1 at the tail of the packet queue 1 is migrated from the first memory to the second memory. For example, after the packet N at the tail of the packet queue 1 is migrated from the first memory to the second memory, if the latency of the packet queue 2 is greater than the latency of the packet queue 1, a packet at the tail of the packet queue 2 is migrated from the first memory to the second memory.

For example, the traffic manager 301 may alternatively record latencies of the w packet queues with relatively high latencies by using two tables. For example, Table 3 is a packet queue information table obtained before migration. The packet queue information table includes identifiers such as QIDs of w1 packet queues, and latencies respectively corresponding to the identifiers of the w1 packet queues. Table 4 is a packet queue information table obtained after migration. The packet queue information table obtained after migration records identifiers of migrated w2 packet queues with relatively high latencies, latencies respectively corresponding to the identifiers of the w2 packet queues, and an identifier of the last packet in a packet queue stored in the first memory. A latency corresponding to an identifier of a specific packet queue in the identifiers of the w2 packet queues is duration in which the last packet in the packet queue stored in the first memory stays in the packet queue.

TABLE 3

| QID (identifier of a packet queue) | Queue latency (latency of a packet queue) |
|---|---|
| Packet queue 1 | 800 μs |
| Packet queue 2 | 780 μs |

TABLE 4

| QID (identifier of a packet queue) | Queue latency (latency of a packet queue) | Last on-chip packet (identifier of the last packet stored in the first memory) |
|---|---|---|
| Packet queue 3 | 770 μs | C |
| Packet queue 4 | 760 μs | D |

Figure 7A:
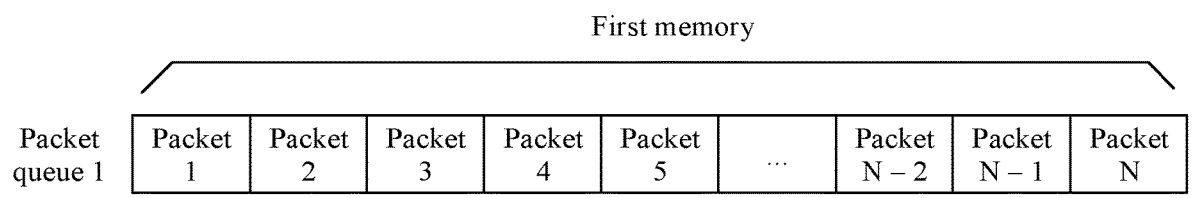
FIG. 7A is a schematic diagram of a packet queue 1 obtained before migration according to an embodiment.
Figure 7B:
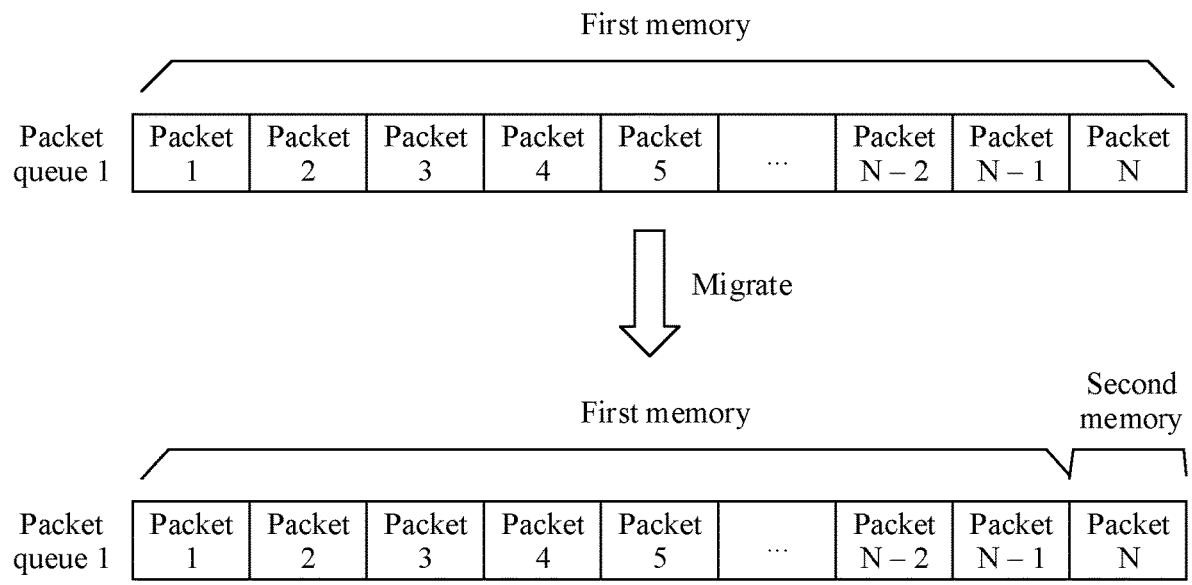
FIG. 7B is a schematic diagram of a packet queue 1 obtained after migration according to an embodiment.

Therefore, when deleting the at least one packet at the tail of the packet queue 1 from the first memory, the traffic manager 301 determines the packet queue 1 based on the identifier of the packet queue 1 that is recorded in Table 3, and migrates the at least one packet at the tail of the packet queue 1 from the first memory to the second memory. After the at least one packet at the tail of the packet queue 1 is migrated from the first memory to the second memory, an example in which one packet (the packet N) is deleted from the packet queue 1 shown in FIG. 7A is used, and the traffic manager 301 re-determines the latency of the packet queue 1, and compares the re-determined latency of the packet queue 1 with a lower latency in Table 4. If the re-determined latency of the packet queue 1 is greater than the lower latency, the traffic manager 301 updates the lower latency in Table 4 to the latency of the packet queue 1, updates an identifier of a packet queue corresponding to the lower latency to the identifier of the packet queue 1, updates a last on-chip packet corresponding to the lower latency to an identifier of the packet N−1 in the packet queue 1, and deletes the identifier of the packet queue 1 and the latency of the packet queue 1 in Table 3. An updated latency of the packet queue 1 is duration in which the packet N−1 is expected to stay in the packet queue 1. When a packet at the head of the packet queue 1 is dequeued from the packet queue 1, the traffic manager 301 also correspondingly modifies the latency of the packet latency 1 in Table 3 or Table 4. Certainly, for the other packet queue shown in Table 3, when a packet at the head of the other queue is dequeued from the other packet queue, the traffic manager 301 also correspondingly updates a latency of the other packet queue in the queue information table. The traffic manager 301 maintains the w packet queues with relatively high latencies that are stored in the queue information table. When a latency of another packet queue is greater than a lower latency in Table 3 because a packet is enqueued into the other queue, the lower latency and an identifier of a packet queue corresponding to the lower latency in Table 3 are updated. For example, a packet is enqueued into a packet queue 5, and a latency of the packet queue 5 is 775 μs, in other words, the latency of the packet queue 5 is greater than the latency of the packet queue 3. In this case, the identifier of the packet queue 3 in Table 2 is replaced with an identifier of the packet queue 5, and the latency of the packet queue 3 in Table 2 is replaced with the latency of the packet queue 5. In addition, after a migration operation is performed on the packet queue 1, there is a vacant place in Table 3 obtained after the updating. Therefore, if the latency of the packet queue 5 is 775 μs because a packet is enqueued into the packet queue 5, in other words, the latency of the packet queue 5 is greater than the latency of the packet queue 3, the identifier of the packet queue 5 and the latency of the packet queue 5 are stored at the vacant place in Table 3.

In a possible implementation, after migrating the at least one packet at the tail of the packet queue 1 from the first memory to the second memory, the traffic manager 301 receives a packet 1 to be enqueued into the packet queue 1. When the packet queue 1 meets at least one of a first condition and a second condition, the traffic manager 301 avoids storing the packet 1 in the first memory, but stores the packet 1 in the second memory. Alternatively, when the packet queue 1 meets neither the first condition nor the second condition, the traffic manager 301 stores the packet 1 in the first memory.

The first condition is as follows: Before the packet 1 is enqueued into the first packet queue, a length of the packet queue 1 stored in the first memory is less than a third threshold, and the third threshold is greater than 0. The second condition is as follows: Before the packet 1 is enqueued into the packet queue 1, duration in which a packet at the tail of the packet queue 1 stored in the first memory is expected to stay in the packet queue 1 is less than a fourth threshold, and the fourth threshold is greater than 0.

After the traffic manager 301 deletes the at least one packet at the tail of the packet queue 1 from the first memory, if the traffic manager 301 receives the packet 1 belonging to the packet queue 1, the traffic manager 301 may directly discard the packet 1 until the entire packet queue 1 becomes shorter (the latency of the packet queue 1 is less than the fourth threshold or the length of the packet queue 1 is less than the third threshold). In this way, it can be ensured to some extent that there is free space to store a packet with a relatively low latency for enqueuing.

The third threshold and the fourth threshold may be preset based on an empirical value. For example, when a length of a packet queue reaches K packets, congestion usually occurs, and the first memory has insufficient space. In this case, the third threshold may be set to K/2, K/3, K/4, or the like. The third threshold and the fourth threshold may alternatively be dynamically set. For example, when it is determined that the packet at the tail of the packet queue 1 is deleted, the latency of the packet queue 1 is X. For example, referring to FIG. 7A, X is equal to duration in which the packet N is expected to stay in the packet queue 1, and the fourth threshold may be set to X/2, X/3, or X/4.

In a possible implementation, when it is determined that the available storage space of the first memory is less than a fifth threshold, and the fifth threshold is less than the first threshold, a packet queue 2 other than the packet queue 1 is selected from the queue information table, and at least one packet at the tail of the packet queue 2 is deleted from the first memory, and the at least one packet deleted from the packet queue 2 is prevented from being stored in the second memory.

It should be understood that, that the available storage space of the first memory is less than the fifth threshold is described from the perspective of the available storage space, and certainly, may be further described from the perspective of used storage space. For example, a forbidden area threshold is set based on total storage space of the first memory. As shown in FIG. 5B, HL represents a forbidden area threshold, and when the used storage space of the first memory is greater than or equal to the forbidden area threshold, the at least one packet at the tail of the first packet queue is deleted from the first memory, and the at least one packet deleted from the packet queue 2 is prevented from being stored in the second memory.

Because of a limitation of an off-chip bandwidth, a migration rate may be less than a rate at which a new packet is enqueued, so that an increasing quantity of resources of the first memory (an on-chip memory) are occupied. Therefore, when occupied space of the first memory reaches the forbidden area threshold, a deletion operation is performed on another packet queue when migration is performed on one packet queue, so that the resource of the first memory can be released as soon as possible. Certainly, when the occupied space of the first memory is less than the forbidden area threshold, the deletion operation performed on the packet queue is stopped.

For a router chip, how to efficiently use a resource of an off-chip memory, in other words, how to efficiently use a resource of a memory (including an on-chip memory and an off-chip memory) to reduce a packet loss as much as possible is also crucial. Therefore, when the off-chip bandwidth is allowed, it is also necessary to determine packets that are to be stored and packets that are to be discarded.

Therefore, in another possible implementation, when it is determined that a sum of the available storage space of the first memory and available storage space of the second memory is less than a sixth threshold, one packet queue such as a packet queue 3 is selected from a total queue information table, and at least one packet (regardless of whether the at least one packet is stored in the first memory or the second memory) at the tail of the packet queue 3 is deleted.

Therefore, the total queue information table may be additionally stored in the network device. Referring to Table 5, the total queue information table includes an identifier of the packet queue 3, and a total latency or a total length of the packet queue 3. The total latency of the packet queue 3 is duration in which a packet at the tail of the packet queue 3 stored in the first memory and the second memory stays in the packet queue 3. For example, the packet queue 3 includes 100 packets, which are respectively a packet 1, a packet 2, a packet 3, . . . , and a packet 100. The packet 1 to the packet 98 are stored in the first memory, and the packet 99 and the packet 100 are stored in the second memory. Therefore, the total latency of the packet queue 3 is duration in which the packet 100 stays in the packet queue 3, and the total length of the packet queue 3 is 100. In other words, when a migration operation is performed on the packet queue 3, the total latency or the total length of the packet queue 3 does not change. The total latency or the total length of the packet queue 3 changes only when a dequeuing or enqueuing operation is performed on the packet queue 3 or only after the packet at the tail of the packet queue 3 is deleted from the first memory and the second memory. Specifically, when a packet at the head of the packet queue 3 is dequeued from the packet queue 3, the total latency or the total length of the packet queue 3 is correspondingly modified in Table 5.

TABLE 5

| QID (identifier of a packet queue) | Queue latency (latency of a packet queue) |
|---|---|
| Packet queue 3 | 900 μs |
| Packet queue 4 | 880 μs |

Certainly, Table 5 may further store a packet queue other than the packet queue 3, for example, the packet queue 4. A total latency of the packet queue 4 is less than a total latency of the packet queue 3, but the total latency of the packet queue 4 is greater than a total latency of another packet queue. When a packet at the head of the packet queue 3 is dequeued from the packet queue 3, the total latency of the packet queue 4 is also correspondingly updated in the total queue information table. The traffic manager 301 maintains d packet queues with relatively high latencies that are stored in the total queue information table, and d is an integer greater than 0. When a latency of another packet queue is greater than a lower total latency in Table 5 because a packet is enqueued into the other packet queue, the lower total latency and an identifier of a packet queue corresponding to the lower total latency in Table 5 are updated. For example, a packet is enqueued into a packet queue 5, and a total latency of the packet queue 5 is greater than the total latency of the packet queue 4. In this case, the identifier of the packet queue 4 in Table 5 is replaced with an identifier of the packet queue 5, and the total latency of the packet queue 4 in Table 5 is replaced with the total latency of the packet queue 5.

Then, the second possible implementation is described in detail.

The plurality of packet queues stored in the first memory are classified into a plurality of packet queue sets. Different packet queue sets may correspond to different parameter value intervals, and the parameter value intervals corresponding to the different packet queue sets do not overlap. A parameter value interval may be a latency interval or a length interval. In subsequent descriptions, the latency interval is used as an example.

In an example, several latency intervals are defined, and the packet queues are classified into different packet queue sets based on latencies of the packet queues. The network device stores an identifier of each packet queue set. A plurality of packet queues in a same packet queue set may be serially connected in a form of a linked list. The first packet queue set is used as an example. The network device stores a first linked list corresponding to the first packet queue set, a plurality of nodes included in the first linked list are in a one-to-one correspondence with the plurality of packet queues in the first packet queue set, and each node in the first linked list includes an identifier of a corresponding packet queue. For example, the first linked list may be stored in the first memory of the network device. Certainly, if the network device further includes another memory, the first linked list may also be stored in the other memory.

Figure 8:
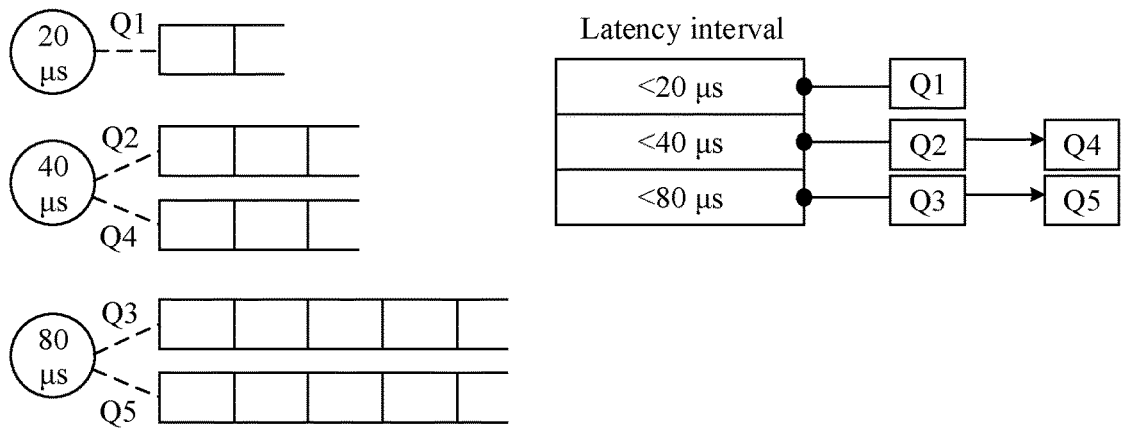
FIG. 8 is a schematic diagram of a packet queue set according to an embodiment.

Referring to FIG. 8, 16 latency intervals are defined: <20 μs, <40 μs, <80 μs, . . . , and >1 millisecond (ms). FIG. 8 merely shows packet queue sets corresponding to three latency intervals. A packet queue set corresponding to the latency interval <20 us includes Q1. A packet queue set corresponding to the latency interval <40 us includes Q2 and Q4, and Q2 and Q4 are connected by using a linked list. A packet queue set corresponding to the latency interval <80 us includes Q3 and Q5, and Q3 and Q5 are connected by using a linked list.

When deleting the at least one packet at the tail of the first packet queue from the first memory based on that the available storage space of the first memory is less than the first threshold, the traffic manager 301 determines the first linked list based on the stored identifier of the first packet queue set, and then determines the first packet queue based on the identifier of the first packet queue in the first linked list.

In the following second possible implementation, how to maintain lengths and/or latencies of a plurality of packet queues when the network device stores the plurality of packet queues in the first memory and the second memory is described in detail.

The network device records packet queue information. The packet queue information includes an identifier of each packet queue set, a latency interval corresponding to the identifier of each packet queue set, an identifier of a packet queue included in each packet queue set, and a parameter value of each packet queue. For example, the packet queue information may be stored in the first memory, or may be stored in the second memory. If the network device further includes another memory, the packet queue information may also be stored in the other memory.

Figure 9A:
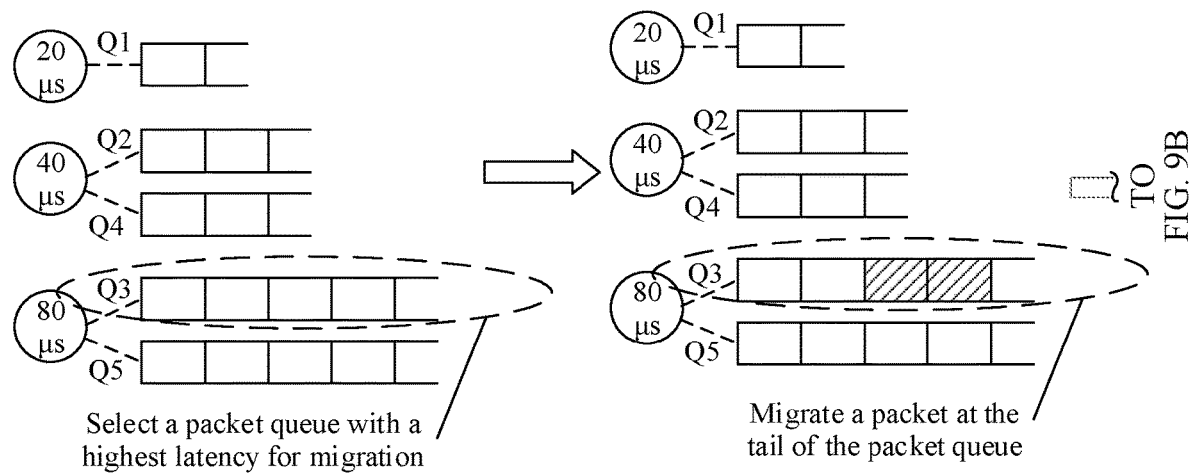
FIG. 9A and FIG. 9B are a schematic flowchart of selecting a first packet queue for migration according to an embodiment.
Figure 9B:
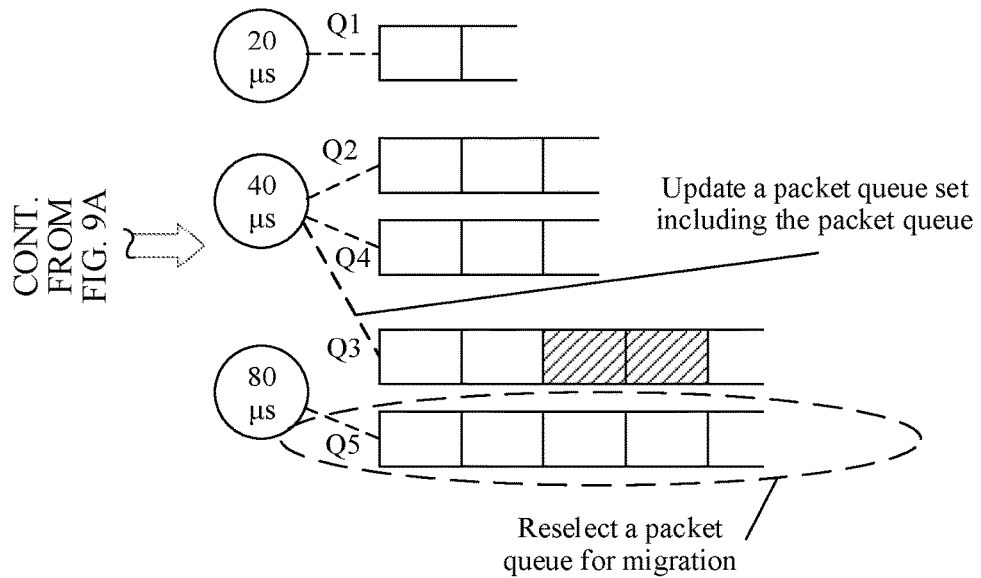

When it is determined that the available storage space of the first memory is less than the first threshold, one packet queue is selected from a packet queue set corresponding to a recorded largest latency interval for migration. For example, referring to packet queues corresponding to different latency intervals shown in FIG. 8, a largest latency interval is the latency interval <80 μs, and one packet queue such as the packet queue Q3 is selected from the latency interval <80 μs. During migration, at least one packet at the tail of the packet queue Q3 is migrated from the first memory to the second memory. Referring to FIG. 9A and FIG. 9B, an example in which two packets at the tail of the packet queue Q3 are migrated from the first memory to the second memory is used, to release a resource of the first memory (the on-chip memory) for a low-latency packet, so as to improve utilization of the on-chip memory. In a migration process, if duration in which a new packet at the tail of the packet queue Q3 that remains in the first memory stays in the packet queue Q3 is less than a threshold of a latency interval corresponding to a current packet queue set in which Q3 is located, the packet queue Q3 is migrated to a packet queue set corresponding to a smaller latency interval. For example, after the at least one packet at the tail of the packet queue Q3 is migrated from the first memory to the second memory, if the duration in which the new packet at the tail of the packet queue Q3 that remains in the first memory stays in the packet queue Q3 is 38 µs, the packet queue Q3 may be serially connected to Q4 by using a linked list.

For example, after the at least one packet at the tail of the packet queue Q3 is migrated from the first memory to the second memory, a storage address, in the first memory, of the new packet at the tail of the packet queue Q3 that remains in the first memory may be recorded, to facilitate subsequent migration of Q3. For the packet queue Q3, if a new packet is subsequently enqueued into the packet queue Q3, the new packet may be directly stored in the second memory, and all packets subsequently enqueued into the packet queue Q3 may be stored in the second memory until the entire packet queue Q3 becomes shorter. In this case, if a new packet is enqueued into the packet queue Q3, the new packet is not stored in the second memory but stored in the first memory. It should be noted that, when some network devices are disposed, a packet needs to first pass through the first memory before being stored in the second memory. In other words, the packet needs to be first stored in the first memory before being directly migrated to the second memory.

That the entire packet queue Q3 becomes shorter means that the at least one of the foregoing first condition and the foregoing second condition is met. For descriptions of the first condition and the second condition, refer to the foregoing descriptions. Details are not described herein again.

After migration processing is performed on the packet queue Q3, if the available storage space of the first memory is still less than the first threshold, one packet queue may be selected again from the packet queue set corresponding to the largest latency interval for migration processing. For example, referring to FIG. 9A and FIG. 9B, the packet queue Q5 is selected for migration processing, and two packets at the tail of the packet queue Q5 that are stored in the first memory are migrated from the first memory to the second memory.

In a possible implementation, when it is determined that the available storage space of the first memory is less than a fifth threshold, and the fifth threshold is less than the first threshold, one packet queue may be selected again from the packet queue set corresponding to the largest latency interval for deletion processing. For example, when migration processing is performed on the packet queue Q3, if it is determined that the available storage space of the first memory is less than the fifth threshold, the packet queue Q5 is selected from the packet queue set corresponding to the largest latency interval, and two packets at the tail of the packet queue Q5 are deleted from the first memory, and at least one packet deleted from the packet queue Q5 is prevented from being stored in the second memory.

Because of a limitation of an off-chip bandwidth, a migration rate may be less than a rate at which a new packet is enqueued, so that an increasing quantity of resources of the first memory (an on-chip memory) are occupied. Therefore, when occupied space of the first memory reaches the forbidden area threshold, in other words, the available storage space of the first memory is less than the fifth threshold, a deletion operation is performed on another packet queue when migration is performed on one packet queue, so that the resource of the first memory can be released as soon as possible. Certainly, when the occupied space of the first memory is less than the forbidden area threshold, the deletion operation performed on the packet queue is stopped.

The network device records packet queue information. When a packet is enqueued into or dequeued from a packet queue, packet queue information of the packet queue needs to be updated, and a storage location for storing the packet queue information needs to be determined by traversing the packet queue information based on an identifier of the packet queue information, to modify the packet queue information, for example, update a parameter value of the packet queue, and update a storage location of a packet at the tail of the packet queue that is stored in the first memory. In the traversal manner, when there is a relatively large quantity of packet queues, a relatively long time is required. Therefore, in this embodiment, a hash manner may be used to assist in recording packet queue information.

Actually, only a packet queue with a relatively high latency or a relatively long packet queue requires migration. To save storage space, packet queue information of some packet queues may be stored and indexed in a hash manner. For example, packet queue information of a packet queue whose latency is greater than T1 or a packet queue whose length is greater than L1 is recorded in a hash manner.

Figure 10A:
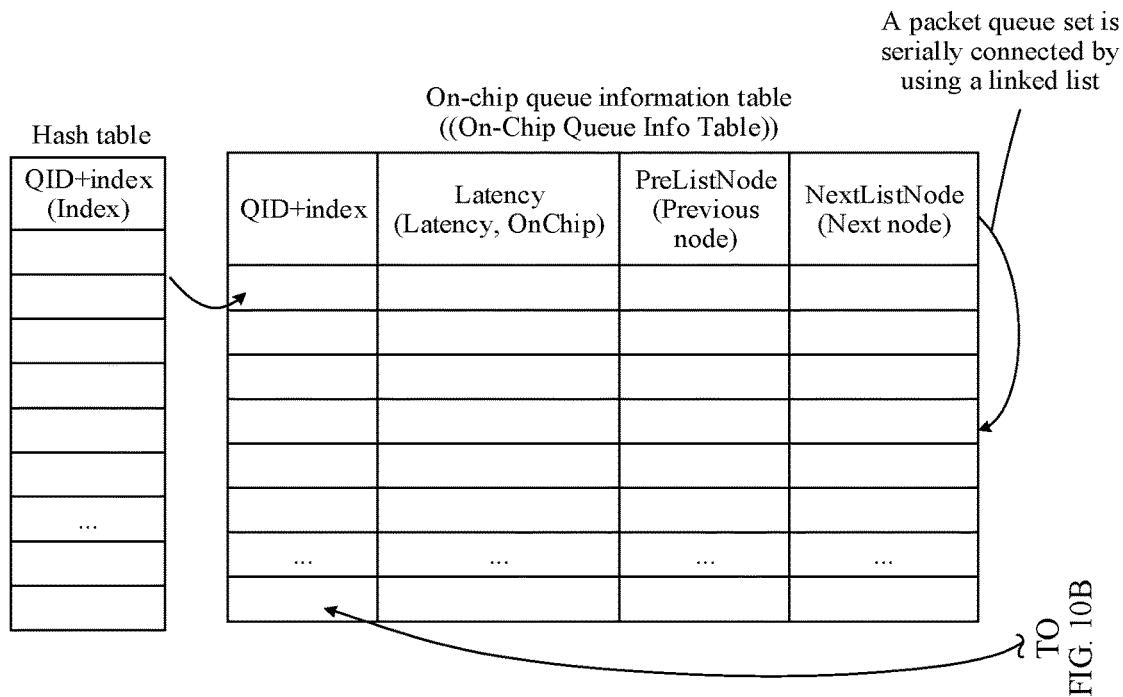
FIG. 10A and FIG. 10B are a schematic diagram of implementing migration by using a hash algorithm according to an embodiment.
Figure 10B:
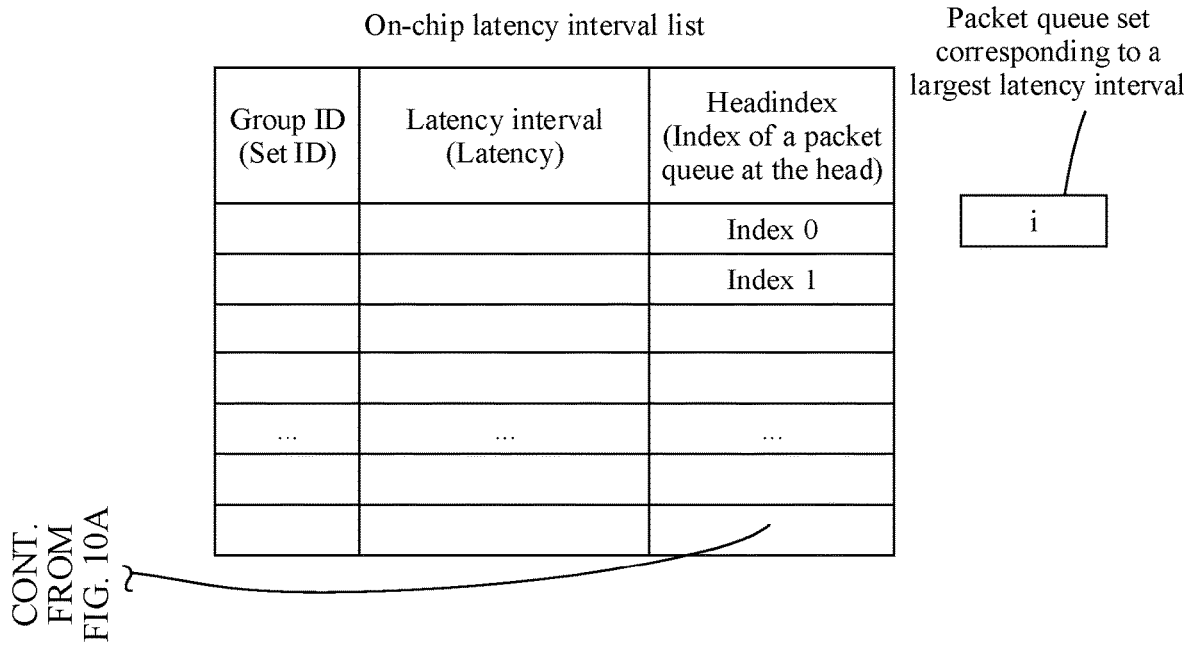

Referring to FIG. 10A and FIG. 10B, a latency is used as an example. The network device stores a hash table, an on-chip queue information (info) table, an on-chip latency interval list, and an identifier such as a group ID of a packet queue set that corresponds to a largest latency interval. The hash table is used to store an identifier (for example, a QID) of a packet queue whose latency is greater than T1 and an index value (for example, an index) of the packet queue, and the index value is used to index and determine a storage location for storing packet queue information of the packet queue. The on-chip queue info table is used to store information such as an identifier of a packet queue, and a latency or a length of the packet queue. The on-chip queue information table is further used to store a storage address of the last packet that is in the packet queue and that is stored in the first memory. If packet queues in the packet queue set is serially connected in a form of a linked list, the on-chip queue information table may further store a previous node of the packet queue and a next node of the packet queue. The on-chip latency interval list includes an identifier of a packet queue set, a latency interval corresponding to the packet queue set, and an index value of a packet queue at the head of a linked list corresponding to the packet queue set.

For example, when the packet 1 is enqueued into the packet queue 1 and stored in the first memory, the latency of the packet queue 1 is greater than T1, an identifier of a packet queue set including the packet queue 1 is determined based on the latency of the packet queue 1, and whether the hash table includes an index of the packet queue 1 corresponding to an identifier (QID) of the packet queue 1 that includes the packet 1 is queried based on a hash algorithm. When the hash table does not include the index of the packet queue 1 corresponding to the identifier of the packet queue 1, the identifier of the packet queue 1 and the index of the packet queue 1 corresponding to the identifier of the packet queue 1 are added to the hash table, and a storage address of the packet 1 in the first memory is added to the on-chip queue information table based on the added index of the packet queue 1. For example, the group ID is equal to 0. Based on the identifier of the packet queue 1, a hash operation is performed by using a QID (for example, 1512)

as an example, to learn that a hash value 1 is equal to f1(1512). Assuming that the hash value 1 is equal to 23, a row f1(1512), namely, 23, in the hash table is searched to determine whether there is an entry whose QID is 1512. If there is no entry whose QID is 1512, an empty entry is selected from storage space of the hash table for storage, and stored content includes [QID; index]. A storage location corresponding to the QID stores 1512, and a storage location corresponding to the index is used to store a row address (for example, a number 99) assigned in the on-chip queue info table. Then, a storage address of the packet 1, a QID of the packet queue 1, and a previous node of the packet queue 1 in a linked list corresponding to the packet queue set are stored at a storage location corresponding to the number 99 in the on-chip queue info table. When the previous node of the packet queue 1 in the linked list corresponding to the packet queue set is determined, an index value of a packet queue at the head of the linked list corresponding to the packet queue set may be determined in the on-chip latency interval list based on that the group ID is equal to 0, and based on the index value of the packet queue at the head of the linked list corresponding to the packet queue set, the on-chip queue information table is searched for an identifier of a packet queue at the tail of the linked list corresponding to the packet queue set, namely, the previous node of the packet queue 1 in the linked list corresponding to the packet queue set.

A hash conflict may occur in a hash manner. To be specific, hash values obtained by performing a hash operation on different QIDs may be the same, and a plurality of QIDs may be mapped to a same hash value or a same row by performing a hash operation. Therefore, in this embodiment, a plurality of entries (for example, four entries, namely, four columns) may be stored in an address of each row in the hash table to avoid a hash conflict. The four entries are completely in parallel. In addition, to further reduce hash conflicts, a plurality of hash tables such as two hash tables may be used in this embodiment. Each hash table uses different hash functions: f1(x) and f2(x). Certainly, more hash tables may be used, for example, a 3-left hash table or a 4-left hash table. However, complexity of solution implementation increases accordingly.

Figure 11A:
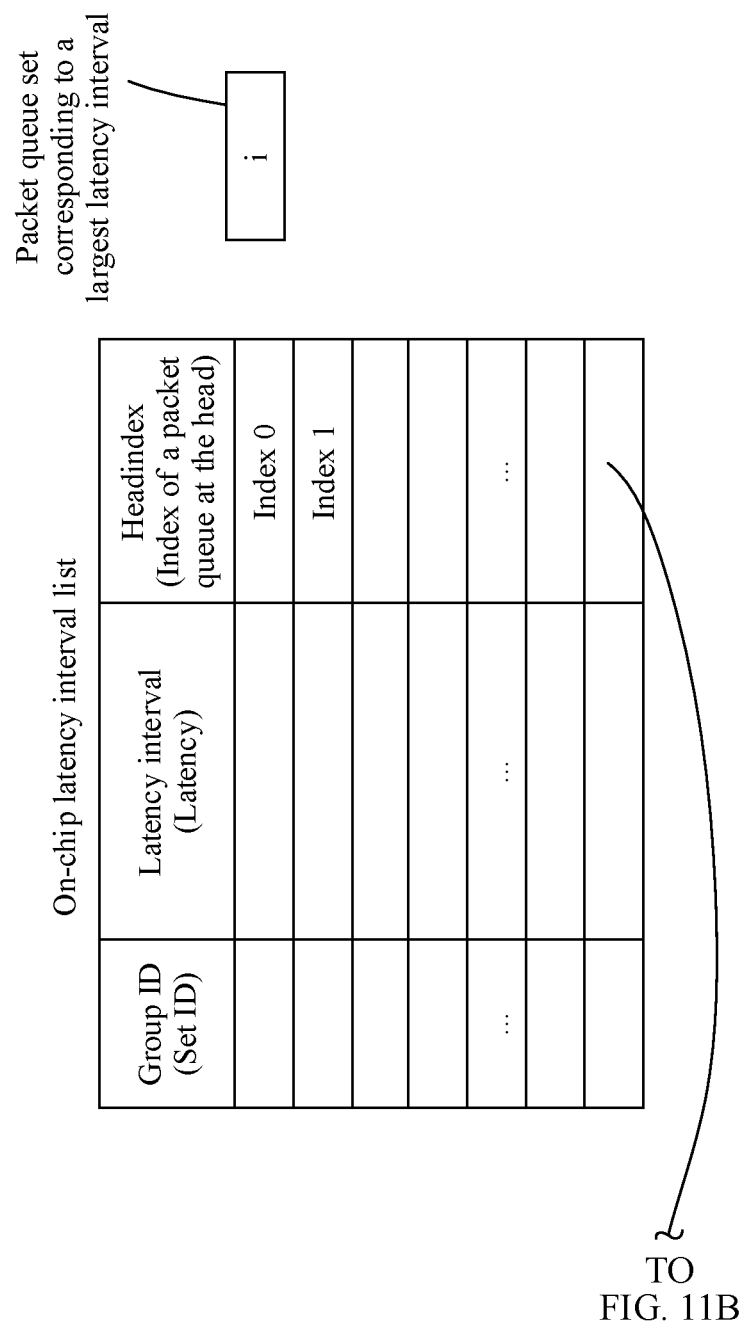
FIG. 11A and FIG. 11B are another schematic diagram of implementing migration by using a hash algorithm according to an embodiment.
Figure 11B:
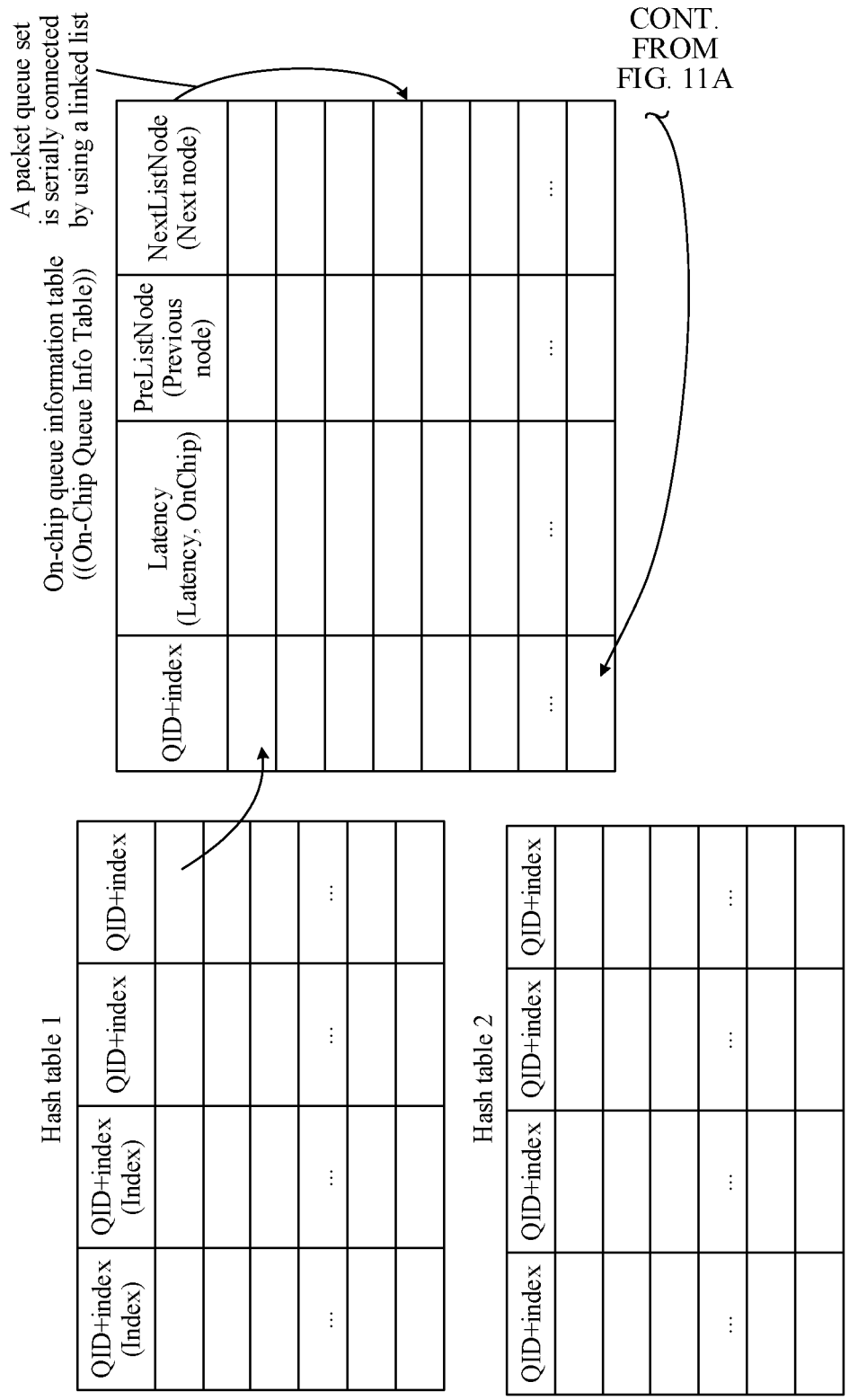

An example in which four entries and two hash tables (a hash table 1 and a hash table 2) are used is used. Referring to FIG. 11A and FIG. 11B, for example, when the packet 1 is enqueued into the packet queue 1 and stored in a first memory, the latency of the packet queue 1 is greater than T1, and based on the identifier of the packet queue 1, a hash operation is performed by using a QID (for example, 1512) as an example, to learn that a hash value 1 is equal to f1(1512), and a hash value 2 is equal to f2(1512). Assuming that the hash value 1 is equal to 23, and the hash value 2 is equal to 35, four entries in a row f1(1512), namely, 23, in the hash table 1 and four entries in a row f2(1512), namely, 35, in the hash table 2 are searched to check whether there is an entry whose QID is 1512. If there is no entry whose QID is 1512, an empty entry (for example, a location at a row 23 and a column 1 in the hash table 1) is selected for storage.

When it is determined that the available storage space of the first memory is less than the first threshold, one packet queue is selected from a packet queue set corresponding to a recorded largest latency interval for migration, and an index of a packet queue at the head of a linked list in the packet queue set corresponding to an identifier (Group ID) of the packet queue set corresponding to the largest latency interval is obtained from the on-chip latency interval list. A storage address, in the first memory, of the at least one packet at the tail of the selected packet queue 1 is determined in the on-chip queue information table based on the index of the packet queue at the head of the linked list, and then the at least one packet at the tail of the packet queue 1 is migrated from the first memory to the second memory based on the storage address.

In a possible implementation, an example in which a memory is a buffer is used. For a router chip, how to efficiently use a resource of an off-chip buffer, in other words, how to efficiently use a resource of a buffer (including an on-chip buffer and an off-chip buffer) to reduce a packet loss as much as possible is also crucial. Therefore, when the off-chip bandwidth is allowed, it is also necessary to determine packets that are to be stored in the buffer and packets that are to be discarded.

Figure 12A:
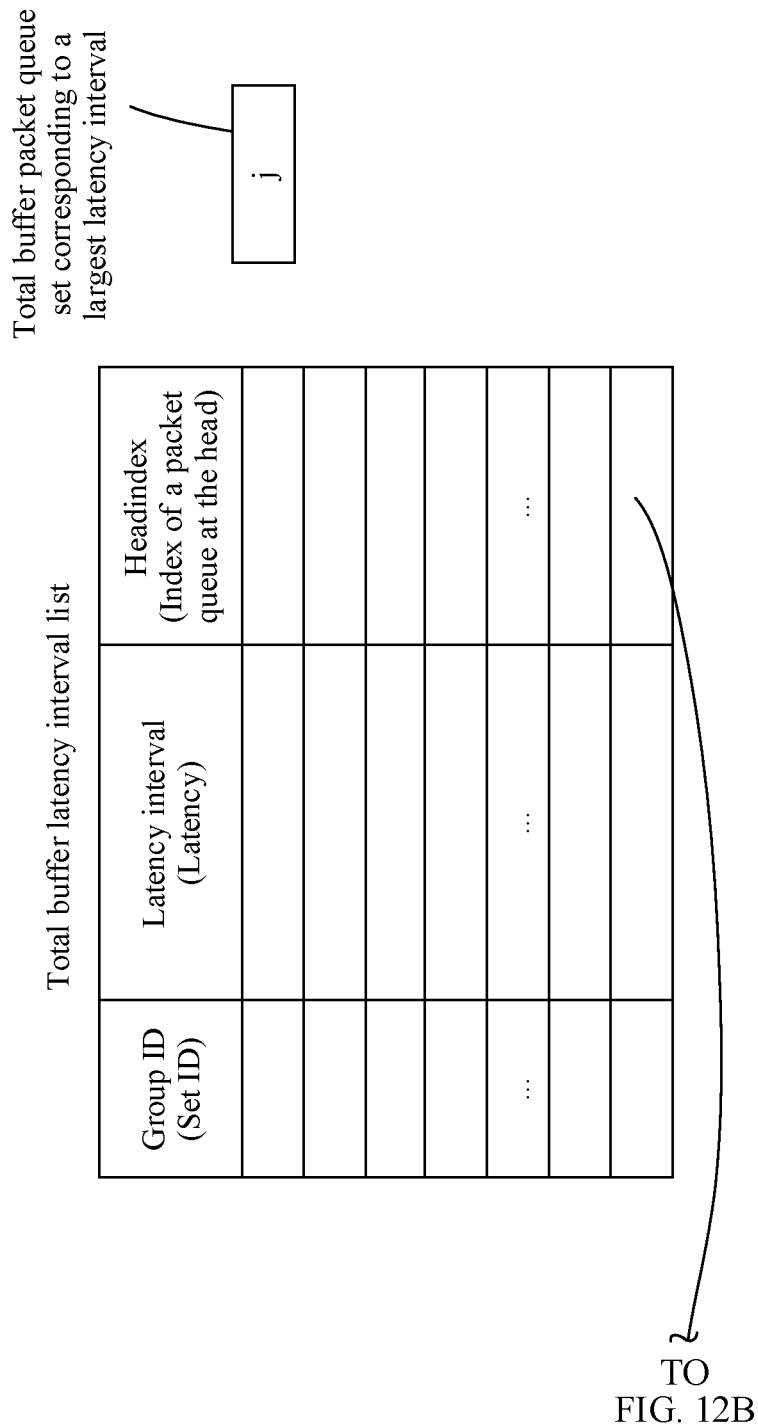
FIG. 12A and FIG. 12B are a schematic diagram of implementing migration for a general memory by using a hash algorithm according to an embodiment.
Figure 12B:
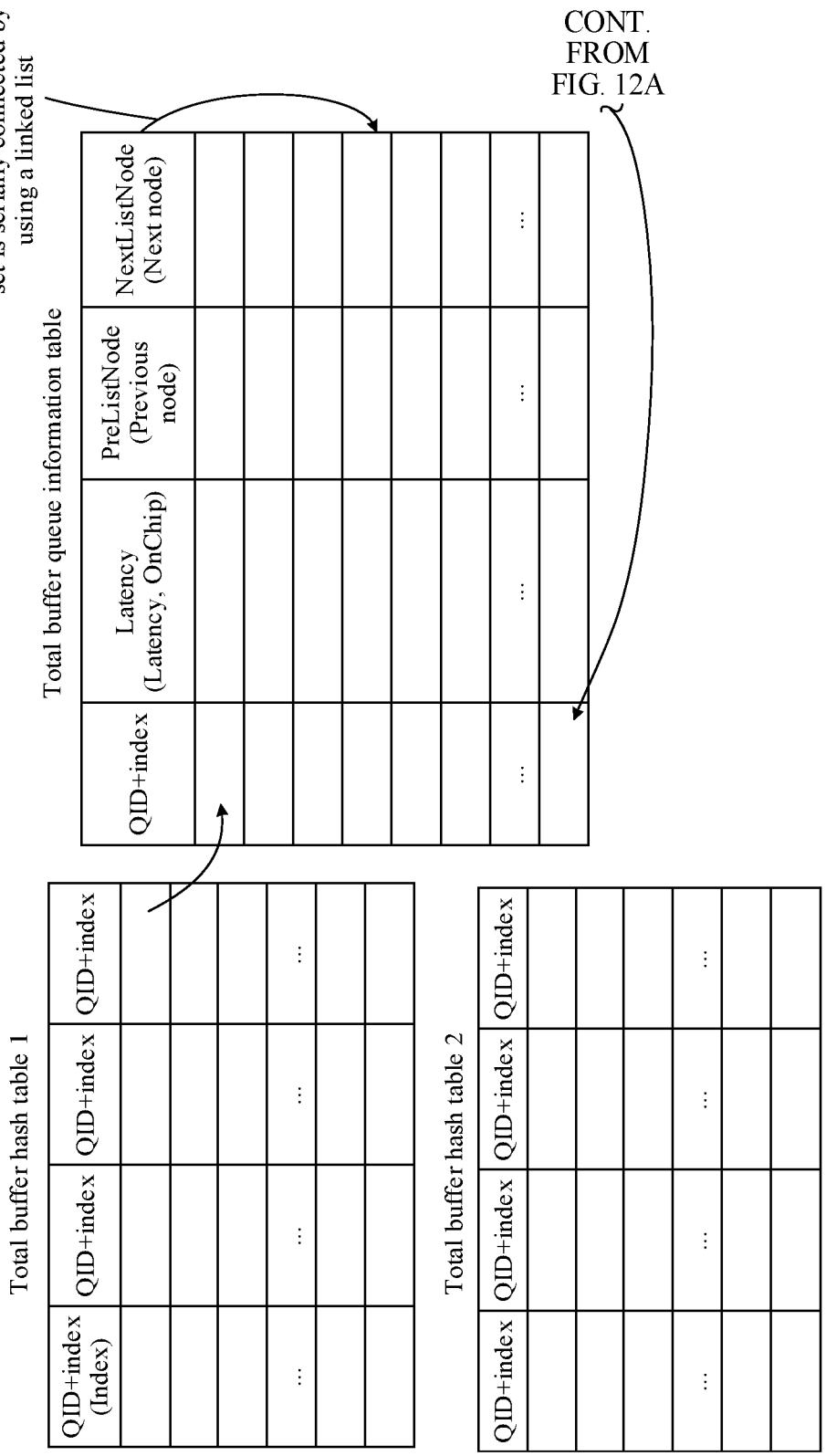

Therefore, a plurality of packet queues stored in a total buffer (the first memory and the second memory) are classified into a plurality of total buffer packet queue sets based on total latencies or total lengths of the packet queues. A total latency of a packet queue is used as an example. Different total buffer packet queue sets may correspond to different total latency intervals, and the total latency intervals corresponding to the different total buffer packet queue sets do not overlap. Referring to FIG. 12A and FIG. 12B, the network device may further store a total buffer hash table, a long queue info table, a total buffer latency interval list, and an identifier such as a group ID of a total buffer packet queue set that corresponds to a largest latency interval and that includes a packet queue.

The total buffer hash table is used to store an identifier (for example, a QID) of a packet queue whose total latency is greater than T2 and an index value (for example, an index) of the packet queue, and the index value is used to index and determine a storage location for storing packet queue information of the packet queue. T2 may be set to a relatively large value. For example, a packet queue is recorded only when T2 exceeds 1 ms. A latency interval corresponding to the total buffer packet queue set may also span relatively widely, so as to reduce a quantity of recorded packet queues and narrow the total buffer packet queue set.

The long queue info table is used to store information such as an identifier of a packet queue, and a total latency or a total length of the packet queue. The long queue information table may be further used to store a storage address of the last packet that is in the packet queue and that is stored in the total buffer. If packet queue in the total buffer packet queue set is serially connected in a form of a linked list, the long queue information table may further store a previous node of the packet queue and a next node of the packet queue. The total buffer latency interval list includes an identifier of a total buffer packet queue set, a total latency interval corresponding to the total buffer packet queue set, and an index value of a packet queue at the head of a linked list corresponding to the total buffer packet queue set.

A manner of updating the total buffer hash table, the long queue info table, the total buffer latency interval list, and the identifier of the total buffer packet queue set that corresponds to the largest latency interval and that includes a packet queue is the same as the foregoing manner of updating the hash table, the on-chip queue information table, the on-chip latency interval list, and the identifier of the packet queue set that correspond to the largest latency interval and that includes a packet queue. Details are not described herein again.

When it is determined that a sum of the available storage space of the first memory and available storage space of the second memory is less than a sixth threshold, one packet queue may be selected from the total buffer packet queue set corresponding to the largest total latency interval, based on the total buffer latency interval list for deletion processing. For example, when it is determined that the sum of the available storage space of the first memory and the available storage space of the second memory is less than the sixth threshold, an index of a queue at the head of a linked list in the total buffer packet queue set corresponding to an identifier of the total buffer packet queue set corresponding to the largest total latency interval is obtained from the total buffer latency interval list, one packet queue such as the packet queue Q3 is selected from the long queue information table based on the index of the queue at the head of the linked list, a storage address, in the total buffer, of at least one packet at the tail of the packet queue Q3 is determined, and the at least one packet at the tail of the packet queue Q3 is deleted from the total buffer based on the storage address, in the total buffer, of the at least one packet at the tail of the packet queue Q3.

In the following second possible implementation, how to maintain lengths and/or latencies of a plurality of packet queues when the network device stores the plurality of packet queues in the first memory is described in detail.

The network device records packet queue information. The packet queue information includes an identifier of each packet queue set, a latency interval corresponding to the identifier of each packet queue set, an identifier of a packet queue included in each packet queue set, and a parameter value of each packet queue. For example, the packet queue information may be stored in the first memory, or may be stored in the second memory. If the network device further includes another memory, the packet queue information may also be stored in the other memory.

When it is determined that the available storage space of the first memory is less than the first threshold, one packet queue is selected from a packet queue set corresponding to a recorded largest latency interval for deletion. For example, referring to packet queues corresponding to different latency intervals shown in FIG. 8, for example, the packet queue Q3, when the packet queue Q3 is discarded, at least one packet at the tail of the packet queue Q3 is deleted from the first memory. An example in which two packets at the tail of the packet queue Q3 are deleted from the first memory is used, to release a resource of the first memory (the on-chip buffer) for a low-latency packet, so as to improve utilization of the on-chip buffer. In a deletion process, if duration in which a new packet at the tail of the packet queue Q3 that remains in the first memory stays in the packet queue Q3 is less than a threshold of a latency interval corresponding to a current packet queue set in which Q3 is located, the packet queue Q3 is migrated to a packet queue set corresponding to a smaller latency interval. For example, after the at least one packet at the tail of the packet queue Q3 is deleted from the first memory, if the duration in which the new packet at the tail of the packet queue Q3 that remains in the first memory stays in the packet queue Q3 is 38 µs, the packet queue Q3 may be serially connected to Q4 by using a linked list.

For the packet queue Q3, if a new packet is subsequently enqueued into the packet queue Q3, the new packet may be directly discarded, and all subsequently received packets included in the packet queue Q3 may be discarded until the entire packet queue Q3 becomes shorter. In this case, if a new packet is enqueued into the packet queue Q3, the new packet is stored in the first memory.

That the entire packet queue Q3 becomes shorter means that the at least one of the foregoing first condition and the foregoing second condition is met. For descriptions of the first condition and the second condition, refer to the foregoing descriptions. Details are not described herein again.

After deletion processing is performed on the packet queue Q3, if the available storage space of the first memory is still less than the first threshold, one packet queue may be selected again from the packet queue set corresponding to the largest latency interval for deletion processing. For example, the packet queue Q5 is selected for deletion processing, and two packets at the tail of the packet queue Q5 are deleted from the first memory.

Actually, only a packet queue with a relatively high latency or a relatively long packet queue requires deletion. To save storage space, packet queue information of some packet queues may be stored and indexed in a hash manner. For example, packet queue information of a packet queue whose latency is greater than T1 or a packet queue whose length is greater than L1 is recorded in a hash manner. For details, refer to descriptions in the foregoing second possible implementation in which the network device maintains the lengths and/or latencies of the plurality of packet queues when the network device stores the plurality of packet queues in the first memory and the second memory. Details are not described herein again.

According to the solutions provided in the embodiments, utilization of the on-chip memory can be improved, and the off-chip memory is not used before usage of the on-chip memory reaches the alarm area threshold, so as to reduce power consumption and a latency when the device is used.

Figure 13:
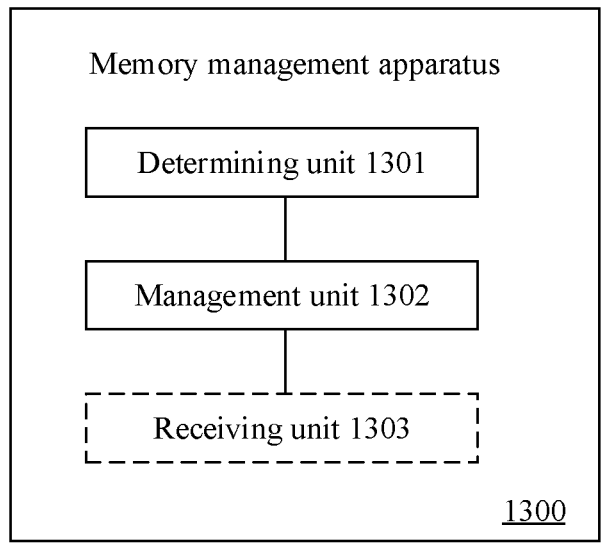
FIG. 13 is a schematic structural diagram of a memory management apparatus according to an embodiment.

FIG. 13 is a schematic structural diagram of a memory management apparatus according to an embodiment. The memory management apparatus may be configured to perform the method shown in FIG. 5A. Specifically, the memory management apparatus may be configured to perform S501 and S502. Referring to FIG. 13, the memory management apparatus 1300 may include a determining unit 1301 and a management unit 1302.

The determining unit 1301 is configured to determine that available storage space of a first memory in a network device is less than a first threshold, where the first threshold is greater than 0, and the first memory stores a first packet queue.

The management unit 1302 is configured to delete at least one packet at the tail of the first packet queue from the first memory based on that the available storage space of the first memory is less than the first threshold.

Specifically, the determining unit 1301 may be configured to perform S501. The management unit 1302 may be configured to perform S502. For specific implementations of the determining unit 1301 and the management unit 1302, refer to descriptions of the embodiment shown in FIG. 5A. Details are not described herein again.

The memory management apparatus 1300 may be the network device. The memory management apparatus 1300 may be the interface board 1230 in the network device. The memory management apparatus 1300 may be the traffic manager 301. In a possible design, the memory management apparatus 1300 may be the interface board 1240 in the network device shown in FIG. 4. The memory management apparatus 1300 may be the traffic manager 402. When the memory management apparatus 1300 is the traffic manager 301, the traffic manager 301 may implement functions of the memory management apparatus 1300.

In a possible design, the first packet queue is one of a plurality of packet queues stored in the first memory, a parameter value of the first packet queue is greater than a parameter value of another packet queue in the plurality of packet queues, a parameter value of a packet queue is a latency of the packet queue or a length of the packet queue, and the latency of the packet queue is duration in which a packet at the tail of the packet queue is expected to stay in the packet queue.

In a possible design, the network device stores a queue information table, and the queue information table records the parameter value of the first packet queue and an identifier of the first packet queue.

The management unit 1302 is further configured to: determine the first packet queue based on the identifier of the first packet queue that is recorded in the queue information table, and delete the at least one packet at the tail of the first packet queue from the first memory.

In a possible design, the network device includes a second memory, and a bandwidth of the second memory is less than a bandwidth of the first memory.

The management unit 1302 is further configured to: after the determining unit 1301 determines that the available storage space of the first memory in the network device is less than the first threshold, store the at least one packet at the tail of the first packet queue in the second memory, and update the parameter value of the first packet queue that is recorded in the queue information table.

When the parameter value of the first packet queue is the latency of the first packet queue, an updated parameter value of the first packet queue is duration in which a first packet is expected to stay in the first packet queue starting from a time at which the at least one packet is deleted from the first memory, the first packet is a packet in the first packet queue, the first packet is adjacent to the at least one packet, and the first packet is located before the at least one packet. Alternatively, when the parameter value of the first packet queue is a length of the first packet queue, an updated parameter value of the first packet queue is a length of the first packet queue that is stored in the first memory and from which the at least one packet is deleted.

In a possible design, the management unit 1302 is further configured to store an identifier of the first packet in the queue information table.

In a possible design, the apparatus may further include a receiving unit 1303 configured to receive a to-be-enqueued packet.

In an example, the receiving unit 1303 receives a second packet. The management unit 1302 is further configured to: enqueue the second packet into a second packet queue; determine a parameter value of the second packet queue that is obtained when the second packet is located at the tail of the second packet queue; and when the parameter value of the second packet queue that is obtained when the second packet is located at the tail of the second packet queue is greater than the parameter value of the first packet queue that is recorded in the queue information table, replace the identifier of the first packet queue that is recorded in the queue information table with an identifier of the second packet queue, and replace the parameter value of the first packet queue that is recorded in the queue information table with the parameter value of the second packet queue.

In another example, the receiving unit 1303 is configured to: after the management unit 1302 deletes the at least one packet at the tail of the first packet queue from the first memory, receive a third packet to be enqueued into the first packet queue.

The management unit 1302 is further configured to: when the first packet queue meets at least one of a first condition and a second condition, store the third packet in the second memory; or when the first packet queue meets neither a first condition nor a second condition, store the third packet in the first memory.

The first condition is as follows: When it is determined whether the third packet is enqueued into the first packet queue, a length of the first packet queue stored in the first memory and the second memory is less than a third threshold, and the third threshold is greater than 0.

The second condition is as follows: When it is determined whether the third packet is enqueued into the first packet queue, duration in which a packet at the tail of the first packet queue stored in the first memory and the second memory is expected to stay in the first packet queue is less than a fourth threshold, and the fourth threshold is greater than 0.

In still another example, the receiving unit 1303 is configured to: after the management unit 1302 deletes the at least one packet at the tail of the first packet queue from the first memory, receive a third packet to be enqueued into the first packet queue. The management unit 1302 is further configured to: when the first packet queue meets at least one of a first condition and a second condition, avoid storing the third packet in the first memory; or when the first packet queue meets neither the first condition nor the second condition, store the third packet in the first memory.

The first condition is as follows: When it is determined whether the third packet is enqueued into the first packet queue, a length of the first packet queue stored in the first memory and the second memory is less than a third threshold, and the third threshold is greater than 0.

The second condition is as follows: When it is determined whether the third packet is enqueued into the first packet queue, duration in which a packet at the tail of the first packet queue stored in the first memory and the second memory is expected to stay in the first packet queue is less than a fourth threshold, and the fourth threshold is greater than 0.

In a possible design, the network device includes a second memory, a bandwidth of the second memory is less than a bandwidth of the first memory, and the first memory further stores a third packet queue. The management unit 1302 is further configured to: after the determining unit 1301 determines that the available storage space of the first memory in the network device is less than the first threshold, store the at least one packet at the tail of the first packet queue in the second memory. The determining unit 1301 is further configured to: after the management unit 1302 deletes the at least one packet at the tail of the first packet queue from the first memory based on that the available storage space of the first memory is less than the first threshold, determine that the available storage space of the first memory is less than a second threshold, where the second threshold is less than the first threshold, and the second threshold is greater than 0. The management unit 1302 is further configured to: delete at least one packet at the tail of the third packet queue from the first memory based on that the available storage space of the first memory is less than the second threshold, and avoid storing the at least one packet at the tail of the third packet queue in the second memory.

In a possible design, the first packet queue is one of a plurality of packet queues included in a first packet queue set, a parameter value of each packet queue in the first packet queue set is greater than a parameter value of each of a plurality of packet queues included in a second packet queue set, all packet queues in the first packet queue set are stored in the first memory, all packet queues in the second packet queue set are stored in the first memory, and the network device stores an identifier of the first packet queue set and an identifier of the second packet queue set.

A parameter value of a packet queue is a latency of the packet queue or a length of the packet queue, and the latency of the packet queue is duration in which a packet at the tail of the packet queue is expected to stay in the packet queue.

The management unit 1302 is further configured to: determine the first packet queue based on the stored identifier of the first packet queue set; and delete the at least one packet at the tail of the first packet queue from the first memory.

In a possible design, the network device stores a first linked list corresponding to the first packet queue set, a plurality of nodes included in the first linked list are in a one-to-one correspondence with the plurality of packet queues in the first packet queue set, and each node in the first linked list includes an identifier of a corresponding packet queue.

When determining the first packet queue based on the stored identifier of the first packet queue set, the management unit 1302 is further configured to: determine the first linked list based on the stored identifier of the first packet queue set; and determine the first packet queue based on an identifier of the first packet queue in the first linked list.

Figure 14:
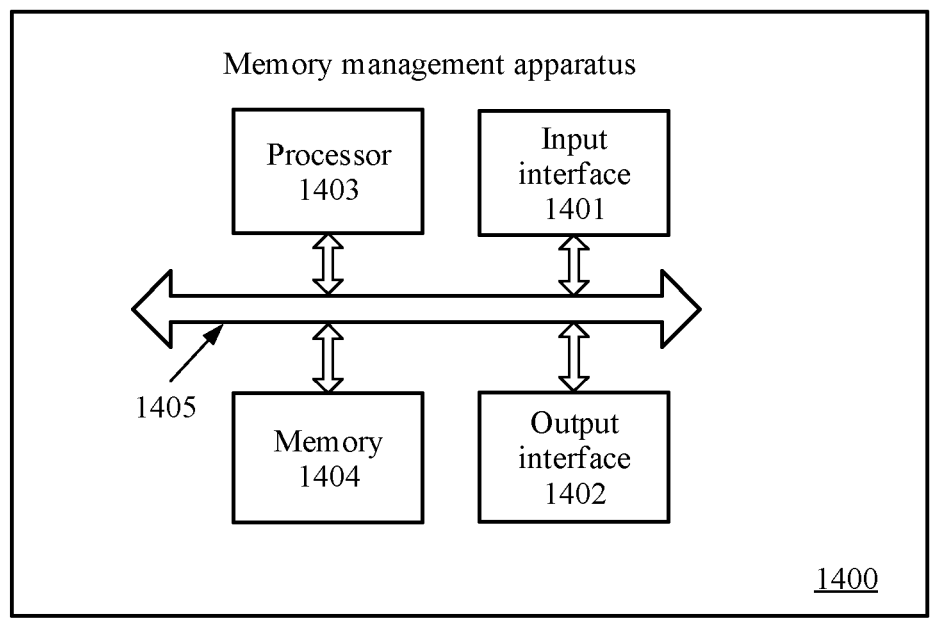
FIG. 14 is a schematic structural diagram of a memory management apparatus according to an embodiment.

FIG. 14 is a schematic structural diagram of another memory management apparatus according an embodiment. The memory management apparatus 1400 may be configured to perform the method shown in FIG. 5A. Referring to FIG. 14, the memory management apparatus 1400 includes an input interface 1401, an output interface 1402, a processor 1403, a memory 1404, and a bus 1405. The input interface 1401, the output interface 1402, the processor 1403, and the memory 1404 can communicate with each other by using the bus 1405. The input interface 1401 is configured to receive a packet. The output interface 1402 is configured to send a packet. The memory 1404 is configured to store a computer program. The processor 1403 may perform the method shown in FIG. 5A by accessing the computer program in the memory 1404. For a specific implementation in which the processor 1403 performs the method shown in FIG. 5A by accessing the computer program in the memory 1404, refer to descriptions of the embodiment shown in FIG. 5. Details are not described herein again.

The memory management apparatus 1400 may be the network device. The memory management apparatus 1400 may be the interface board 1230 in the network device. The memory management apparatus 1400 may be the traffic manager 301. In a possible design, the memory management apparatus 1400 may be the interface board 1240 in the network device shown in FIG. 4. The memory management apparatus 1400 may be the traffic manager 402. When the memory management apparatus 1400 is the traffic manager 301, the traffic manager 301 may implement functions of the memory management apparatus 1400. Specifically, the input interface 1401 may be implemented by the physical interface card 1233. The output interface 1402 may be implemented by the iFIC 303. The processor 1403 may be implemented by a WRED circuit 603 and a queue threshold determining circuit 604. For specific implementations of the input interface 1401, the output interface 1402, the processor 1403, and the memory 1404, refer to descriptions of the embodiment shown in FIG. 6. Details are not described herein again.

A computer-readable storage medium is configured to store a computer program. When the computer program is executed, a computer may be enabled to perform the method shown in FIG. 5A. For details, refer to descriptions of the embodiment shown in FIG. 5A. Details are not described herein again. In a possible design, the computer-readable storage medium may be a non-volatile computer-readable storage medium.

A computer program product includes a computer program. When the computer program is executed, a computer may be enabled to perform the method shown in FIG. 5A. For details, refer to descriptions of the embodiment shown in FIG. 5A. Details are not described herein again.

It should be understood that sequence numbers of the foregoing processes do not mean execution sequences in various embodiments. The execution sequences of the processes should be determined according to functions and internal logic of the processes, and should not be construed as any limitation on the implementation processes of the embodiments.

A person of ordinary skill in the art may be aware that, in combination with the examples described in the embodiments disclosed in this specification, modules and method operations may be implemented by electronic hardware or a combination of computer software and electronic hardware. Whether the functions are performed by hardware or software depends on particular applications and design constraint conditions of the technical solutions. A person skilled in the art may use different methods to implement the described functions for particular applications.

A person skilled in the art may clearly understand that, for the purpose of convenient and brief description, for a detailed working process of the foregoing system, apparatus, and module, refer to a corresponding process in the foregoing method embodiments. Details are not described herein again.

The software in the foregoing embodiments may be implemented in a form of a computer program product. The computer program product includes one or more computer instructions. When the computer program instructions are loaded and executed on the computer, all or some of the procedures or functions according to the embodiments are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The wired manner may be a coaxial cable, an optical fiber, or a digital subscriber line (DSL). The wireless manner may be infrared, wireless, or microwave. The computer-readable storage medium may be any usable medium accessible by a computer, or a data storage device, such as a server or a data center, integrating one or more usable media. The usable medium may be a magnetic medium, an optical medium, a semiconductor medium, or the like. The embodiments in this specification are all described in a progressive manner. For same or similar parts in the embodiments, refer to these embodiments. Each embodiment focuses on a difference from other embodiments. Especially, apparatus and system embodiments are basically similar to a method embodiment, and therefore are described briefly. For related parts, refer to partial descriptions in the method embodiment. The magnetic medium may be a floppy disk, a hard disk, or a magnetic tape. The optical medium may be a Digital Versatile Disc (DVD). The semiconductor medium may be a solid-state disk (SSD).

What is claimed is:

1. A method comprising:
   storing packet queues in a first memory of a network device, the packet queues comprising a first packet queue and a second packet queue, wherein a first parameter value of the first packet queue is greater than a second parameter value of the second packet queue, wherein the first parameter value is a first latency of the first packet queue or a first length of the first packet queue, wherein the second parameter value is a second latency of the second packet queue or a second length of the second packet queue, wherein the first latency is a first duration that a first packet at a first tail of the first packet queue is expected to stay in the first packet queue, and wherein the second latency is a second duration that a second packet at a second tail of the second packet queue is expected to stay in the second packet queue;
   make a first determination that an available storage space of the first memory is less than a first threshold, wherein the first threshold is greater than 0; and
   deleting the first packet at the first tail of the first packet queue from the first memory in response to the first determination.

2. The method of claim 1, further comprising:
   storing a queue information table in the network device, wherein the queue information table records the first parameter value and a first identifier of the first packet queue; and
   determining, before deleting the first packet, the first packet queue based on the first identifier.

3. The method of claim 2, wherein after making the first determination, the method further comprises:
   storing the first packet in a second memory of the storage device, wherein the second memory has a second bandwidth that is less than a first bandwidth of the first memory; and
   updating the first parameter value to obtain an updated parameter value,
   wherein when the first parameter value is the first latency, the updated parameter value is a duration in which a third packet is expected to stay in the first packet queue starting from a first time at which the first packet is deleted from the first memory, the third packet is in the first packet queue, the third packet is adjacent to the first packet, and the third packet is before the first packet, or
   wherein when the first parameter value is the first length, the updated parameter value is a length of the first packet queue after the first packet is deleted.

4. The method of claim 3, further comprising storing a third identifier of the third packet in the queue information table.

5. The method of claim 2, further comprising:
   receiving a third packet;
   enqueuing the third packet into a third packet queue;
   obtain a third parameter value of the third packet queue when the third packet is located at the second tail; and
   replacing the first identifier with a third identifier of the third packet queue and replacing the first parameter value with the third parameter value when the third parameter value is greater than the first parameter value.

6. The method of claim 1, wherein the further comprising:
   storing, after making the first determination, the first packet in a second memory of the network device, wherein the second memory has a second bandwidth that is less than a first bandwidth of the first memory; and
   after deleting the first packet:
   make a second determination that the available storage space is less than a second threshold, wherein the second threshold is less than the first threshold and greater than 0,
   deleting the second packet at the second tail of the second packet queue from the first memory in response to the second determination, and
   avoiding storing the at second packet in the second memory.

7. The method of claim 1, wherein the first packet queue set corresponds to a first linked list comprising identifiers of packet queues, and wherein the method further comprises:
   determining the first linked list based on a first identifier identifying a first packet queue set; and
   determining the first packet queue based on a third identifier of the first packet queue in the first linked list.

8. An apparatus comprising:
   a memory configured to store instructions; and
   a processor coupled to the memory and configured to execute the instructions to:
   store packet queues in a first memory of a network device, the packet queues comprising a first packet queue and a second packet queue, wherein a first parameter value of the first packet queue is greater than a second parameter value of the second packet queue, wherein the first parameter value is a first latency of the first packet queue or a first length of the first packet queue, wherein the second parameter value is a second latency of the second packet queue or a second length of the second packet queue, wherein the first latency is a first duration that a first packet at a first tail of the first packet queue is expected to stay in the first packet queue, and wherein the second latency is a second duration that a second packet at a second tail of the second packet queue is expected to stay in the second packet queue;
   make a first determination that an available storage space of the first memory is less than a first threshold, wherein the first threshold is greater than 0; and
   delete the first packet at the first tail of the first packet queue from the first memory.

9. The apparatus of claim 8, wherein the processor is further configured to:
   store a queue information table in the network device, wherein the queue information table records the first parameter value and a first identifier of the first packet queue; and
   determine, before deleting the first packet, the first packet queue based on the first identifier.

10. The apparatus of claim 9, wherein after making the first determination, the processor is further configured to:
    store the first packet in a second memory of the storage device, wherein the second memory has a second bandwidth that is less than a first bandwidth of the first memory; and
    update the first parameter value to obtain an updated parameter value,
    wherein when the first parameter value is the first latency, the updated parameter value is a duration in which a third packet is expected to stay in the first packet queue starting from a first time at which the first packet is deleted from the first memory, the third packet is in the first packet queue, the third packet is adjacent to the first packet, and the third packet is before the first packet, or wherein when the first parameter value is the first length, the updated parameter value is a length of the first packet queue after the first packet is deleted.

11. The apparatus of claim 10, wherein the processor is further configured to store a third identifier of the third packet in the queue information table.

12. The apparatus of claim 9, further comprising a receiver configured to receive a second packet, wherein the processor is further configured to:

enqueue the third packet into a third packet queue;

obtain a third parameter value of the third packet queue when the third packet is located at the second tail; and replace the first identifier with a third identifier of the third packet queue and replace the first parameter value with the third parameter value when the third parameter value is greater than the first parameter value.

13. The apparatus of claim 8, wherein the processor is further configured to:

store, after making the first determination, the first packet in a second memory of the network device, wherein the second memory has a second bandwidth that is less than a first bandwidth of the first memory;

after deleting the first packet:

make a second determination that the available storage space is less than a second threshold, wherein the second threshold is less than the first threshold and greater than 0, delete the second packet at the second tail of the second packet queue from the first memory in response to the second determination, and avoid storing the second packet in the second memory.

14. The apparatus of claim 8, wherein the first packet queue set corresponds to a first linked list comprising identifiers of packet queues, and wherein the processor is further configured to:

determine the first linked list based on a first identifier identifying a first packet queue set; and determine the first packet queue based on a third identifier of the first packet queue in the first linked list.

15. A non-transitory computer-readable storage medium configured to store a computer program product, wherein the computer program comprising instructions that, when executed by a processor, cause an apparatus to:

store packet queues in a first memory of a network device, the packet queues comprising a first packet queue and a second packet queue, wherein a first parameter value of the first packet queue is greater than a second parameter value of the second packet queue, wherein the first parameter value is a first latency of the first packet queue or a first length of the first packet queue, wherein the second parameter value is a second latency of the second packet queue or a second length of the second packet queue, wherein the first latency is a first duration that a first packet at a first tail of the first packet queue is expected to stay in the first packet queue, and wherein the second latency is a second duration that a second packet at a second tail of the second packet queue is expected to stay in the second packet queue;

make a first determination that an available storage space of the first memory is less than a first threshold, wherein the first threshold is greater than 0; and deleting the first packet at the first tail of the first packet queue from the first memory in response to the first determination.

* * * * *